(12) United States Patent
Chung et al.

(10) Patent No.: US 10,884,848 B2
(45) Date of Patent: Jan. 5, 2021

(54) MEMORY DEVICE, MEMORY SYSTEM INCLUDING THE SAME AND OPERATION METHOD OF THE MEMORY SYSTEM

(71) Applicant: SK hynix Inc., Gyeonggi-do (KR)

(72) Inventors: Hoiju Chung, San Jose, CA (US); Young-Do Hur, Chungcheongbuk-do (KR); Hyuk Lee, Gyeonggi-do (KR); Jang-Ryul Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/408,673

(22) Filed: May 10, 2019

(65) Prior Publication Data

US 2019/0347158 A1 Nov. 14, 2019

Related U.S. Application Data

(60) Provisional application No. 62/669,675, filed on May 10, 2018.

(51) Int. Cl.
  *G06F 11/10* (2006.01)
  *G06F 11/07* (2006.01)
(52) U.S. Cl.
  CPC ...... *G06F 11/1044* (2013.01); *G06F 11/0793* (2013.01); *G06F 11/1016* (2013.01)
(58) Field of Classification Search
  CPC ............. G06F 11/1044; G06F 11/0793; G06F 11/1016
  See application file for complete search history.

(56) References Cited

U.S. PATENT DOCUMENTS

| | | | |
|---|---|---|---|
| 8,514,646 B1* | 8/2013 | Nan | G11C 11/5642 365/185.02 |
| 9,563,502 B1 | 2/2017 | Alhussien et al. | |
| 2006/0176003 A1* | 8/2006 | Hosono | G11B 19/04 318/632 |
| 2006/0176004 A1* | 8/2006 | Hosono | G05D 19/02 318/632 |
| 2014/0359395 A1* | 12/2014 | Ellis | G06F 11/1016 714/763 |

(Continued)

OTHER PUBLICATIONS

Cai, Y., et al., "Error Characterization, Mitigation, and Recovery in Flash-Memory-Based Solid-State Drives", Proceedings of the IEEE, vol. 105, Issue: 9, IEEE, Sep. 2017, pp. 1666-1704. (Year: 2017).*

*Primary Examiner* — Kyle Vallecillo
(74) *Attorney, Agent, or Firm* — IP & T Group LLP

(57) ABSTRACT

A memory device includes: an in-memory error correction code generating circuit suitable for generating an in-memory error correction code based on a data received from a memory controller during a write operation; a memory core suitable for storing the received data and the in-memory error correction code during the write operation; an in-memory error correction circuit suitable for correcting an error of the data which is read from the memory core based on the in-memory error correction code which is read from the memory core during a read operation; and a data transmitter suitable for transferring the data whose error is corrected by the in-memory error correction circuit to the memory controller during the read operation, and transferring the data which is read from the memory core to the memory controller during a read retry operation.

18 Claims, 14 Drawing Sheets

(56) References Cited

U.S. PATENT DOCUMENTS

2015/0070988 A1* 3/2015 Park .................. G06F 11/141
                                              365/185.03
2015/0089278 A1* 3/2015 Patapoutian ........ G06F 11/1048
                                              714/6.12

* cited by examiner

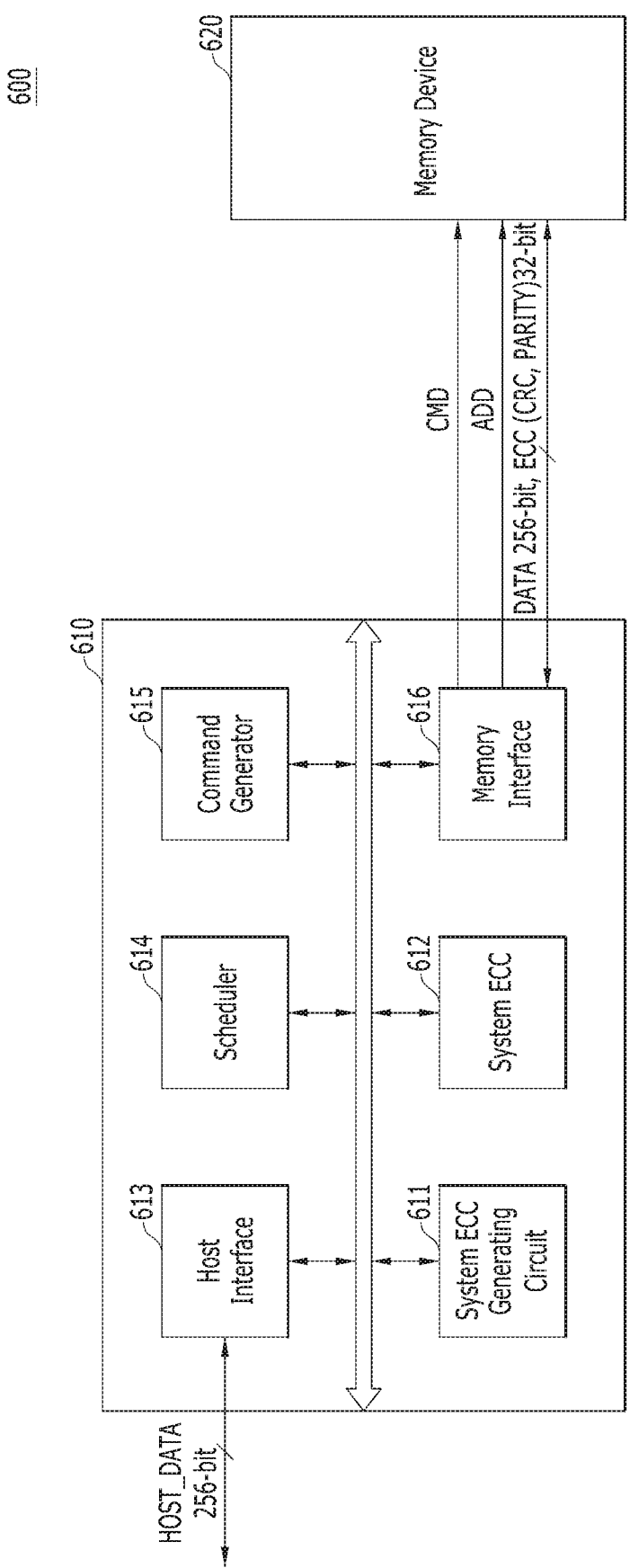

MEMORY DEVICE, MEMORY SYSTEM INCLUDING THE SAME AND OPERATION METHOD OF THE MEMORY SYSTEM

CROSS-REFERENCE TO RELATED APPLICATIONS

The present application claims priority of U.S. Provisional Application No. 62/669,675, filed on May 10, 2018, which is incorporated herein by reference in its entirety.

BACKGROUND

1. Field

Various embodiments of the present invention relate to a memory device, a memory system including the memory device, and a method of operating a memory system.

2. Description of the Related Art

In the past, the semiconductor memory device industry was able to produce many originally good dies on the wafers, which means that memory chips were produced with no defective memory cells through a semiconductor fabrication process. However, as the capacity of memory devices increases, it becomes more difficult to fabricate a memory device having no defective memory cell, and presently, it is unlikely/unrealistic that such an error-free memory device may be fabricated. To address the concern, a repair method of replacing defective memory cells with redundant memory cells included in a memory device, is being used.

As another way, an error correction circuit (ECC circuit) for correcting errors in a memory system is used to correct errors occurred in memory cells and errors occurred while data are transferred during a read operation and a write operation of the memory system.

SUMMARY

Embodiments of the present invention are directed to a method for increasing the efficiency of error correction in a memory system.

In accordance with an embodiment of the present invention, a memory device includes: an in-memory error correction code generating circuit suitable for generating, in a write operation, an in-memory error correction code based on data received from a memory controller; a memory core suitable for storing the data and the in-memory error correction code; an in-memory error correction circuit suitable for correcting, in a read operation, an error of the data which is read from the memory core, based on the in-memory error correction code which is read from the memory core; and a data transmitter suitable for, in the read operation, transmitting the data whose error is corrected by the in-memory error correction circuit to the memory controller, and transmitting, in a read retry operation, the data which is read from the memory core to the memory controller without error correction.

In accordance with another embodiment of the present invention, a memory system includes: a memory controller; and a memory device, wherein the memory controller includes: a system error correction code generating circuit suitable for generating a system error correction code to be stored in the memory device along with a write data based on the write data; and a system error correction circuit suitable for correcting an error of data which is read from the memory device, based on the system error correction code read from the memory device, wherein the memory controller commands the memory device to perform a read retry operation when an error correction operation of the system error correction circuit fails, and wherein the memory device comprises: an in-memory error correction code generating circuit suitable for generating an in-memory error correction code based on the write data and the system error correction code which are received in a write operation; a memory core suitable for storing the write data, the system error correction code, and the in-memory error correction code; an in-memory error correction circuit suitable for correcting, in a read operation, an error of the data and the system error correction code that are read from the memory core, based on the in-memory error correction code read from the memory core; and a data transmitter suitable for transmitting, in the read operation, the data and the system error correction code whose errors are corrected by the in-memory error correction circuit to the memory controller, and transmitting, in the read retry operation, the data and the system error correction code that are read from the memory core to the memory controller without error correction.

In accordance with another embodiment of the present invention, a method for operating a memory system includes: reading, by the memory device, a data, a system error correction code, and an in-memory error correction code which are stored in the memory device, based on a read command and a read address transferred from the memory controller; correcting, by the memory device, an error of the read data and the read system error correction code based on the read in-memory error correction code; transmitting, by the memory device, the error-corrected data and system error correction code to the memory controller; correcting, by the memory controller, an error of the error-corrected data transmitted from the memory device, based on the error-corrected system error correction code transmitted from the memory device; transferring, by the memory controller, a read retry command and a read retry address to the memory device when a failure occurs in the correcting of the error of the error-corrected data; reading, by the memory device, the data and the system error correction code which are stored in the memory device, based on the read retry address and the read retry command; transmitting, by the memory device, the data and the system error correction code that are read based on the read retry address and the read retry command to the memory controller without error correction; and correcting, by the memory controller, an error of the data transmitted from the memory device, based on the error correction code transmitted from the memory device.

The method for operating a memory system further includes: generating, by the memory controller, the system error correction code based on a write data; transferring, by the memory controller, a write command, a write address, the write data, and the system error correction code to the memory device; generating, by the memory device, an in-memory error correction code based on the write data and the system error correction code; and storing, by the memory device, the write data, the system error correction code, and the in-memory error correction code corresponding to the write command and the write address in the memory device.

In accordance with another embodiment of the present invention, a memory device includes: an in-memory error correction code generating circuit suitable for generating, in a write operation, an in-memory error correction code based on data received from a memory controller; a memory core suitable for storing the data and the in-memory error correction code; an in-memory error correction circuit suitable for correcting, in a read operation, an error of the data which is read from the memory core, based on the in-memory error correction code which is read from the memory core; a data transmitter suitable for, in the read operation, transmitting the data whose error is corrected by the in-memory error correction circuit to the memory controller; an error correction history storing circuit suitable for storing an error correction history of the in-memory error correction circuit; and a read retry control circuit suitable for comparing, in a read retry operation, an address stored in the error correction history storing circuit with a read retry address, and when the address is the same as the read retry address, controlling the data read from the memory core based on the read retry address, to be transmitted to the memory controller through the data transmitter without error correction.

In accordance with another embodiment of the present invention, a memory system includes: a memory controller; and a memory device, wherein the memory controller includes: a system error correction code generating circuit suitable for generating a system error correction code to be stored in the memory device along with a write data based on the write data; and a system error correction circuit suitable for correcting an error of data which is read from the memory device, based on the system error correction code which is read from the memory device, wherein the memory controller commands the memory device to perform a read retry operation when an error correction operation of the system error correction circuit fails, and wherein the memory device comprises: an in-memory error correction code generating circuit suitable for generating an in-memory error correction code based on the write data and the system error correction code that are received in a write operation; a memory core suitable for storing the write data, the system error correction code, and the in-memory error correction code; an in-memory error correction circuit suitable for correcting, in a read operation, an error of the data and the system error correction code which are read from the memory core, based on the in-memory error correction code which is read from the memory core; a data transmitter suitable for transmitting, in the read operation, the data and the system error correction code whose errors are corrected by the in-memory error correction circuit to the memory controller; an error correction history storing circuit suitable for storing an error correction history of the in-memory error correction circuit; and a read retry control circuit suitable for comparing, in a read retry operation, an address stored in the error correction history storing circuit with a read retry address, and when the address and the read retry address are the same, controlling the data and the system error correction code that are read from the memory core based on the read retry address, to be transmitted to the memory controller through the data transmitter without error correction.

In accordance with another embodiment of the present invention, a method for operating a memory system includes: reading, by the memory device, a data, a system error correction code, and an in-memory error correction code which are stored in the memory device, based on a read command and a read address transferred from the memory controller; correcting, by the memory device, an error of the read data and the read system error correction code based on the read in-memory error correction code; storing, by the memory device, the read address as an error correction address when the error is corrected in the correcting of the error; transmitting, by the memory device, the error-corrected data and system error correction code to the memory controller; correcting, by the memory controller, an error of the error-corrected data transmitted from the memory device, based on the error-corrected system error correction code transmitted from the memory device; transferring, by the memory controller, a read retry command and a read retry address to the memory device when a failure occurs in the correcting of the error of the error-corrected data; reading, by the memory device, the data, the system error correction code, and the in-memory error correction code which are stored in the memory device, based on the read retry address and the read retry command; comparing the read retry address with the error correction address; when the read retry address and the error correction address are the same in the comparing, transmitting, by the memory device, the data and the system error correction code that are read based on the read retry address and the read retry command to the memory controller without error correction; and correcting, by the memory controller, an error of the data transmitted from the memory device, based on the error correction code transmitted from the memory device.

In accordance with another embodiment of the present invention, a memory device includes: an in-memory error correction code generating circuit suitable for generating, in a write operation, an in-memory error correction code based on data which is received from a memory controller; a memory core suitable for storing the data and the in-memory error correction code; an in-memory error correction circuit suitable for correcting, in a read operation, an error of the data read from the memory core, based on the in-memory error correction code read from the memory core, and generating error correction bit information; a data transmitter suitable for, in the read operation, transmitting the data whose error is corrected by the in-memory error correction circuit to the memory controller; an error correction history storing circuit suitable for storing an error correction history of the in-memory error correction circuit; and a read retry control circuit suitable for comparing, in a read retry operation, an address stored in the error correction history storing circuit with a read retry address, and when the address and the read retry address are the same, controlling the error correction bit information stored in the error correction history storing circuit, to be transmitted to the memory controller through the data transmitter.

In accordance with another embodiment of the present invention, a memory system includes: a memory controller; and a memory device, wherein the memory controller includes: a system error correction code generating circuit suitable for generating a system error correction code to be stored in the memory device along with a write data based on the write data; and a system error correction circuit suitable for correcting an error of data which is read from the memory device, based on the system error correction code which is read from the memory device, wherein the memory controller commands the memory device to perform a read retry operation when an error correction operation of the system error correction circuit fails, wherein the memory device comprises: an in-memory error correction code generating circuit suitable for generating an in-memory error correction code based on the write data and the system error correction code that are received in a write operation; a memory core suitable for storing the write data, the system error correction code, and the in-memory error correction code; an in-memory error correction circuit suitable for correcting, in a read operation, an error of the data and the system error correction code which are read from the memory core, based on the in-memory error correction code which is read from the memory core, and generating error correction bit information; a data transmitter suitable for transmitting, in the read operation, the data and the system error correction code whose errors are corrected by the in-memory error correction circuit to the memory controller; an error correction history storing circuit suitable for storing an error correction history of the in-memory error correction circuit; and a read retry control circuit suitable for comparing, in a read retry operation, an address stored in the error correction history storing circuit with a read retry address, and when the address and the read retry address are the same, controlling the error correction bit information stored in the error correction history storing circuit to be transmitted to the memory controller through the data transmitter, and wherein the system error correction circuit restores the data and the system error correction code that are read in the read operation, based on the error correction bit information, and corrects an error of the restored data based on the restored system error correction code.

In accordance with another embodiment of the present invention, a method for operating a memory system includes: reading, by the memory device, a data, a system error correction code, and an in-memory error correction code from which are stored in the memory device, based on a read command and a read address transferred from the memory controller; correcting, by the memory device, an error of the read data and the read system error correction code based on the read in-memory error correction code; storing, by the memory device, the read address as an error correction address and storing error correction bit information when the errors are corrected in the correcting of the error; transmitting, by the memory device, the error-corrected data and system error correction code to the memory controller; correcting, by the memory controller, an error of the error-corrected data transmitted from the memory device based on the error-corrected system error correction code transmitted from the memory device; transferring, by the memory controller, a read retry command and a read retry address from the memory controller to the memory device when a failure occurs in the correcting of the error of the error-corrected data; comparing the read retry address with the error correction address; and when the read retry address and the error correction address are the same, transmitting, by the memory device, the error correction bit information to the memory controller through the data transmitter; and restoring, by the memory controller, the data and the system error correction code that are read in the read operation, based on the error correction bit information, and correcting an error of the restored data based on the restored system error correction code.

The method for operating the memory system further includes: when the read retry address and the error correction address are different from each other, reading, by the memory device, the data, the system error correction code, and the in-memory error correction code from the memory device; correcting, by the memory device, an error of the data and the system error correction code corresponding to the read retry address, based on the in-memory error correction code corresponding to the read retry address; and transmitting, by the memory device, the error-corrected data and system error correction code to the memory controller.

In accordance with another embodiment of the present invention, a method for operating a memory device includes: an in-memory error correction code generating circuit suitable for generating, in a write operation, an in-memory error correction code based on data and a system error correction code provide by a memory controller; a memory core suitable for storing the data, the system error correction code, and the in-memory error correction code; and an in-memory error correction circuit suitable for correcting, in a read operation, an error of the data and the system error correction code which are read from the memory core, based on the in-memory error correction code read from the memory core, wherein the error-corrected data and system error correction code are provided to a memory controller in the read operation, and when a read retry operation is performed on a same address as the error-corrected data, the data and the system error correction code bypassed by the in-memory error correction circuit or error correction bit information, are provided to the memory controller.

BRIEF DESCRIPTION OF THE DRAWINGS

FIG. 6 is a block diagram illustrating a memory system in accordance with another embodiment of the present invention.

DETAILED DESCRIPTION

Figure 1:
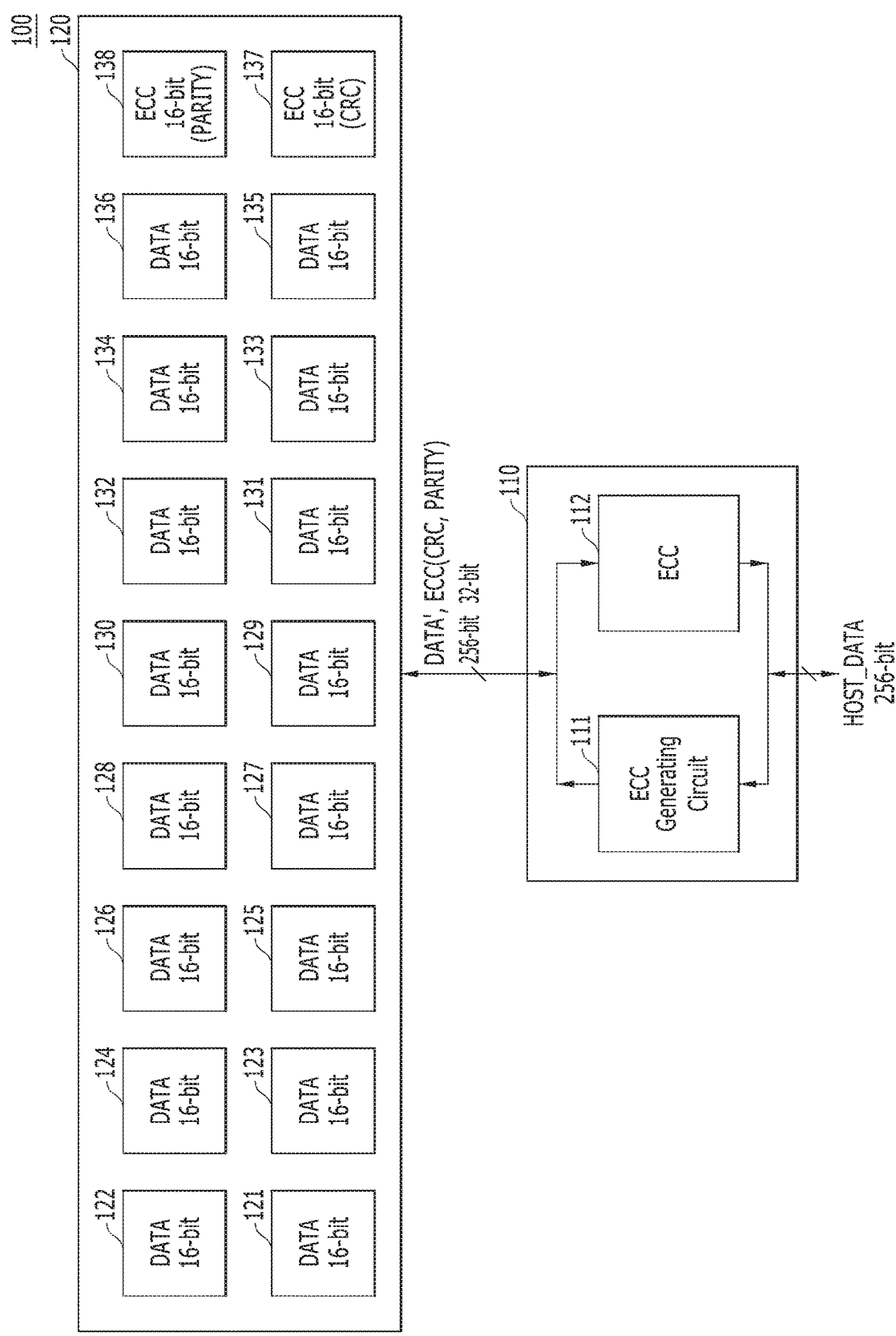
FIG. 1 is a block diagram illustrating a memory system in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is noted that reference to "an embodiment" does not necessarily mean only one embodiment, and different references to "an embodiment" are not necessarily to the same embodiment(s).

It will be understood that, although the terms "first" and/or "second" may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof.

The above-described embodiments are merely for the purpose of understanding the technical spirit of the present disclosure and the scope of the present disclosure should not be limited to the above-described embodiments. It will be obvious to those skilled in the art to which the present disclosure pertains that other modifications based on the technical spirit of the present disclosure may be made in addition to the above-described embodiments.

Unless otherwise defined, all terms including technical and scientific terms used herein have the same meaning as commonly understood by one of ordinary skill in the art to which the present disclosure belongs. Unless otherwise defined in the present disclosure, the terms should not be construed as being ideal or excessively formal.

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

Hereinafter, the various embodiments of the present invention will be described in detail with reference to the attached drawings.

FIG. 1 is a block diagram illustrating a memory system 100 in accordance with an embodiment of the present invention. For clarity, FIG. 1 shows only components directly related to the storing of data and error correction of data in the memory system 100.

Referring to FIG. 1, the memory system 100 may include a memory controller 110 and a memory module 120.

The memory controller 110 may control the operations of the memory module 120, such as a read operation and a write operation, according to a request from a host. The memory controller 110 may include an error correction code (ECC) generating circuit 111 for generating a system error correction code ECC during a write operation, and an error correction circuit (ECC) 112 for correcting an error of data DATA based on the system error correction code ECC during a read operation.

The error correction code generating circuit 111 may generate the system error correction code ECC for correcting an error based on data HOST_DATA transferred from the host during a write operation. By way of example, the unit of data processed in a single write operation, that is, the unit of a data word, is 256 bits. For example, in such a case, the error correction code generating circuit 111 may generate a 32-bit system error correction code ECC based on 256-bit data HOST_DATA. Out of the 32-bit system error correction code ECC, 16 bits may be used for a Cyclic Redundancy Check (CRC) code for the 256-bit data, and the other 16 bits may be a simple parity code (PARITY) for the 256-bit data and the 16-bit CRC code. During a write operation, since only the system error correction code ECC is generated without performing an error correction operation, the data HOST_DATA transferred from the host and the data DATA transferred from the memory controller 110 to the memory module 120 may be the same. A code word may represent both the data DATA and the system error correction code ECC. A single code word of 288 bits may be divided into 18 symbols, each with 16 bits. When one symbol is of 16 bits, the 256-bit data DATA may be divided into 16 symbols, and the 32-bit system error correction code ECC may be divided into a CRC code of one symbol and a simple parity code of one symbol. To be specific, the CRC code may be a CRC-16 code, and the simple parity code may be generated through a logic XOR operation, by unit of symbol, onto the remaining symbols of the entire code word excluding the simple parity code in the entire code word.

The error correction circuit 112 may correct an error of the data DATA transferred from the memory module 120 based on the system error correction code ECC transferred from the memory module 120 during a read operation. The error correction circuit 112 may correct the error of the data by detecting the error based on the CRC code and restoring the symbol based on the simple parity code. To this end, a series of operations may be repeated until no error is detected. The series of operations may include, for example, detecting whether there is an error or not through a CRC operation using the CRC code; restoring a first symbol through a parity operation based on the parity code while assuming that there is an error in the first symbol; detecting whether there is an error or not through a CRC operation after the first symbol is restored; restoring a second symbol through a parity operation based on the parity code while assuming that there is an error in the second symbol; detecting whether there is an error or not through a CRC operation after the second symbol is restored; restoring a third symbol through a parity operation based on the parity code while assuming that there is an error in the third symbol; and detecting whether there is an error or not through a CRC operation after the third symbol is restored, and so forth. In this way, the error correction circuit 112 is able to correct an error of one symbol.

The memory module 120 may include 18 memory devices 121 to 138. Each of the memory devices 121 to 138 may be one among all kinds of memories, such as Dynamic Random Access Memory (DRAM), Phase-Change Random Access Memory (PCRAM), and flash memory. In an embodiment, the memory module 120 may be a Dual In-Line Memory Module (DIMM) type. A 288-bit code word, i.e., an 18-symbol code word, including 256-bit data DATA and a 32-bit system error correction code (ECC), may be distributively stored into the 18 memory devices 121 to 128. The 18 symbols forming the code word may be written into the 18 memory devices 121 to 138 one symbol at a time during a single write operation, and a total of 18 symbols may be read, one symbol by one symbol, from the 18 memory devices 121 to 138, respectively, during a single read operation. In each of the memory devices 121 to 138, the code word which is stored by a corresponding memory device is shown. For example, the memory device 123 may store 1-symbol data of 16 bits, and the memory device 138 may store 1-symbol ECC code of 16 bits (CRC code of ECC).

Figure 2:
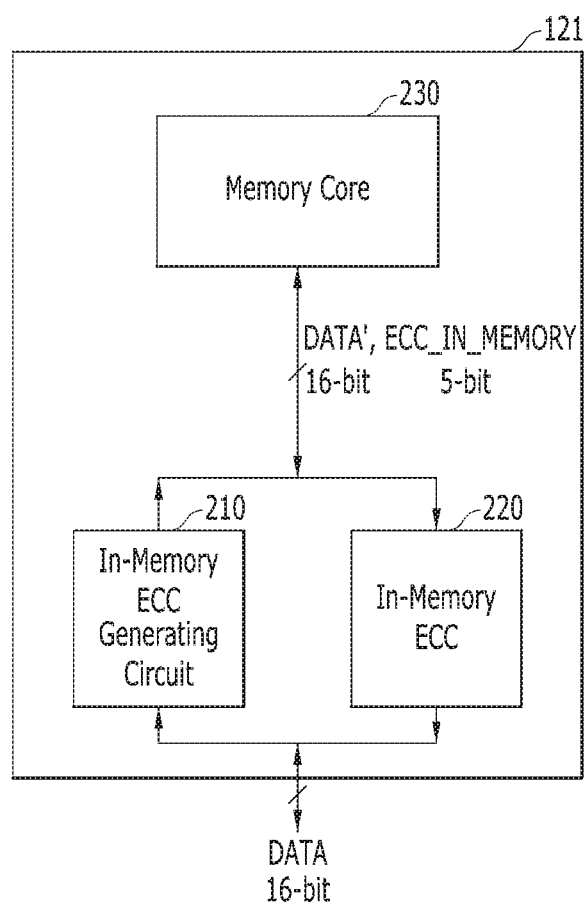
FIG. 2 is a detailed diagram of a memory device shown in FIG. 1.

FIG. 2 is a detailed diagram of the memory device 121 shown in FIG. 1. For clarity, FIG. 2 shows only components directly related to the storing of data and error correction of data in the memory device 121. The other memory devices 122 to 138 of FIG. 1 may have the same configuration as the memory device 121 of FIG. 2.

Referring to FIG. 2, the memory device 121 may include an in-memory error correction code (ECC) generating circuit 210, an in-memory error correction circuit (ECC) 220, and a memory core 230. The in-memory error correction code generating circuit 210 may generate an in-memory error correction code ECC_IN_MEMORY for error correction based on the data DATA received by the memory device 121. For example, the in-memory error correction code generating circuit 210 may generate a 5-bit in-memory error correction code ECC_IN_MEMORY for error correction of the data DATA based on the 16-bit data DATA. In an embodiment, the in-memory error correction code ECC_IN_MEMORY may include a Hamming code. During a write operation, since no error correction operation is performed, the data DATA received by the memory device 121 and data DATA' transferred to the memory core 230 may be the same.

The memory core 230 may include a circuit area for storing the data DATA' and the in-memory error correction code ECC_IN_MEMORY in the memory device 121. The memory core 230 may include a plurality of cell arrays and circuits for writing the data DATA' and the in-memory error correction code ECC_IN_MEMORY into the cell arrays and for reading the data DATA' and the in-memory error correction code ECC_IN_MEMORY from the cell arrays. During a write operation, the data DATA' received by the memory device 121 and the in-memory error correction code ECC_IN_MEMORY generated in the in-memory error correction code generating circuit 210 may be written into the memory core 230. Also, during a read operation, the data DATA' and the in-memory error correction code ECC_IN_MEMORY may be read from the memory core 230.

The in-memory error correction circuit 220 may be able to correct an error of the data DATA' that is read from the memory core 230 based on the in-memory error correction code ECC_IN_MEMORY read from the memory core 230. The data DATA whose error is corrected by the in-memory error correction circuit 220 may be transferred from the memory device 121 to the memory controller 110. The in-memory error correction circuit 220 may be able to correct a 1-bit error which generally occurs in the memory device.

The circuits 210 and 220 are for performing an error correction operation of the memory device 121 itself, and thus the error correction operation may be performed hidden to the memory controller 110. In other words, the memory controller 110 may not be aware whether the additional in-memory error correction code ECC_IN_MEMORY is stored in the memory device 121. Also, the memory controller 110 may not be aware whether an in-memory error correction operation is performed internally in the memory device 121.

Since the error correction operation of the in-memory error correction circuit 220 may have to be performed hidden within a short period of time, its error correction capability is inevitably small. For example, the in-memory error correction circuit 220 may correct an error of up to one bit only. Furthermore, when an error exceeding the error correction capability of the in-memory error correction circuit 220 occurs, errors caused by malfunction may be rather increased. For example, in the case where a 2-bit error occurs, the in-memory error correction circuit 220 may not correct the 2-bit error and may increase the number of the bits of the error to 3 bits.

Even though an error exceeding the error correction capability of the in-memory error correction circuit 220 occurs and thus the error caused by malfunction is greatly increased, no concerns may be caused in the operation of the memory system 100. That is, since the memory device 121 only stores one symbol among the 18 symbols of the entire code word, even though the number of errors is increased as a result of the operation of the in-memory error correction circuit 220, the increased errors exist only in one symbol among the symbols of the entire code word and the errors may be corrected by the error correction circuit 112 of the memory controller 110.

Figure 3:
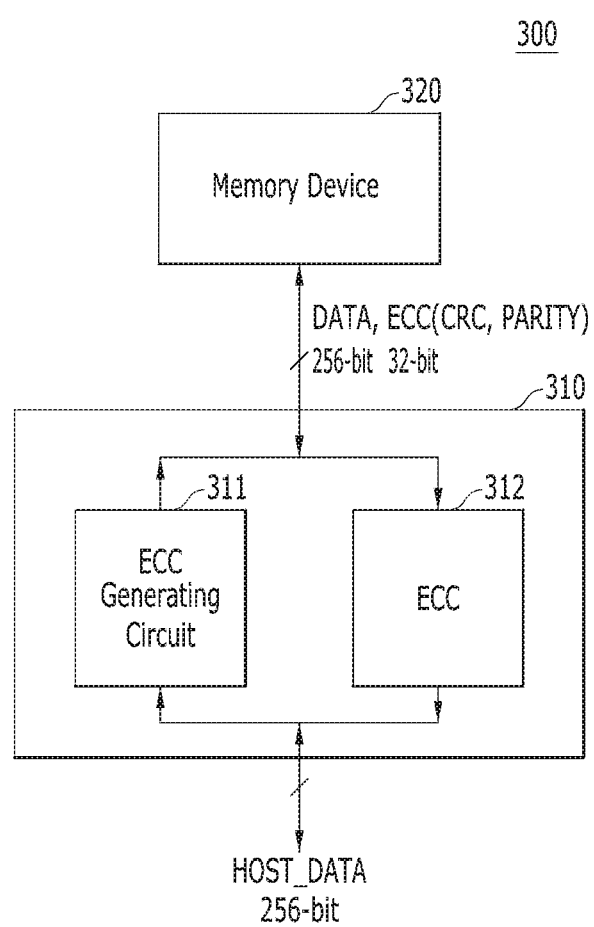
FIG. 3 is a block diagram illustrating a memory system in accordance with another embodiment of the present invention.

FIG. 3 is a block diagram illustrating a memory system 300 in accordance with another embodiment of the present invention. For clarity, FIG. 3 shows only components directly related to the storing of data and error correction of data in the memory system 300.

Referring to FIG. 3, the memory system 300 may include a memory controller 310 and a memory device 320.

The memory controller 310 may control the operations of the memory device 320, such as a read operation and a write operation, according to a request from a host. The memory controller 310 may include an error correction code (ECC) generating circuit 311 which generates a system error correction code ECC during a write operation and an error correction circuit (ECC) 312 which corrects an error of data DATA based on a system error correction code ECC during a read operation.

The error correction code generating circuit 311 may generate the system error correction code ECC for correcting an error based on data HOST_DATA transferred from the host during a write operation. By way of example, the unit of data processed during a single write operation, that is, the unit of a data word, is 256 bits. In this case, the error correction code generating circuit 311 may generate a 32-bit system error correction code ECC based on 256-bit data HOST_DATA. Out of the 32-bit system error correction code ECC, 16 bits may be used for a Cyclic Redundancy Check (CRC) code for the 256-bit data, and the other 16 bits may be a simple parity code (PARITY) for the 256-bit data and the 16-bit CRC code. During a write operation, since only the system error correction code ECC is generated without performing an error correction operation, the data HOST_DATA transferred from the host and the data DATA transferred from the memory controller 310 to the memory device 320 may be the same. A code word may represent both the data DATA and the system error correction code ECC. A single code word of 288 bits may be divided into 18 symbols. When one symbol is of 16 bits, the 256-bit data DATA may be divided into 16 symbols, and the 32-bit system error correction code ECC may be divided into a CRC code of one symbol and a simple parity code of one symbol. To be specific, the CRC code may be a CRC-16 code, and the simple parity code may be generated through a logic XOR operation, by unit of symbol, onto the remaining symbols of the entire code word excluding the simple parity.

The error correction circuit 312 may correct an error of the data DATA transferred from the memory device 320 based on the system error correction code ECC transferred from the memory device 320 during a read operation. The error correction circuit 312 may correct the error of the data by detecting the error based on the CRC code and restoring the symbol based on the simple parity code. To this end, a series of operations may be repeated until no error is detected. The series of operations may include, for example, detecting whether there is an error or not through a CRC operation using the CRC code; restoring a first symbol through a parity operation based on the parity code while assuming that there is an error in the first symbol; detecting whether there is an error or not through a CRC operation after the first symbol is restored; restoring a second symbol through a parity operation based on the parity code while assuming that there is an error in the second symbol; detecting whether there is an error or not through a CRC operation after the second symbol is restored; restoring a third symbol through a parity operation based on the parity code while assuming that there is an error in the third symbol; and detecting whether there is an error or not through a CRC operation after the third symbol is restored, and so forth. In this way, the error correction circuit 312 is able to correct an error of one symbol.

The memory device 320 may store a 288-bit code word, i.e., an 18-symbol code word, including data DATA and an error correction code ECC. The entire 18 symbols forming the code word may be stored in the memory device 320 during a single write operation, and the entire 18 symbols may be read from the memory device 320 during a single read operation. By way of example and not limitation, the memory device 320 may be a high bandwidth memory (HBM). HBM may be a memory with higher bandwidth and density than those of a general memory. The HBM may be characterized in that memory chips are stacked based on 3-dimensional through silicon via (3D-TSV) technology and a large number of data pins operate to increase input/output (I/O) bandwidth. In the case of the HBM, the entire code word corresponding to a single write command may be written into one memory device during a write operation, and the entire code word corresponding to a single read command may be read from one memory device during a read operation. The feature of the memory device 320 in the memory system of FIG. 3 may be characterized in that the entire code word is written into one memory device 320 and the entire code word is read from one memory device 320. As long as the condition is satisfied, other kinds of memories except the HBM may be used as the memory device 320 of the memory system 300.

Figure 4:
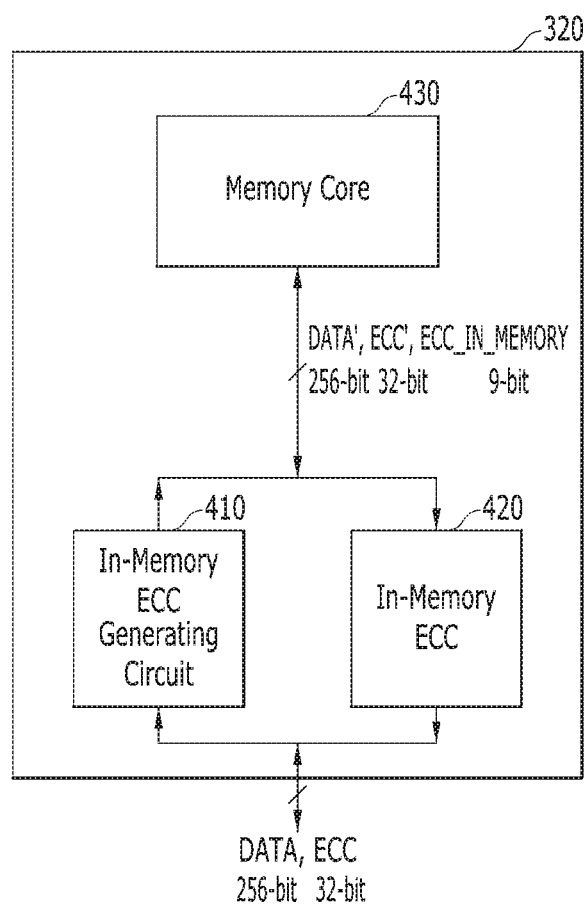
FIG. 4 is a detailed diagram illustrating a memory device shown in FIG. 3.

FIG. 4 is a detailed diagram of the memory device 320 shown in FIG. 3. For clarity, FIG. 4 illustrates only components directly related to the storing of data and error correction of data in the memory device 320.

Referring to FIG. 4, the memory device 320 may include an in-memory error correction code (ECC) generating circuit 410, an in-memory error correction circuit (ECC) 420, and a memory core 430.

The in-memory error correction code generating circuit 410 may generate an in-memory error correction code ECC_IN_MEMORY for correcting errors of the data DATA and the system error correction code ECC, based on the data DATA and the system error correction code ECC received by the memory device 320. For example, the in-memory error correction code generating circuit 410 may generate a 9-bit in-memory error correction code ECC_IN_MEMORY based on 256-bit data and a 32-bit error correction code, i.e., a message of a total of 288 bits. In an embodiment, the in-memory error correction code ECC_IN_MEMORY may include a Hamming code. During a write operation, since no error correction operation is performed, the data DATA and the system error correction code ECC received by the memory device 320 may be the same as the data DATA' and the system error correction code ECC' transferred to the memory core 430.

The memory core 430 may include a circuit area for storing the data DATA', the system error correction code ECC', and the in-memory error correction code ECC_IN_MEMORY in the memory device 320. The memory core 430 may include a plurality of cell arrays and circuits for writing the data DATA', the system error correction code ECC', and the in-memory error correction code ECC_IN_MEMORY into the cell arrays and for reading the data DATA', the system error correction code ECC', and the in-memory error correction code ECC_IN_MEMORY from the cell arrays.

The in-memory error correction circuit 420 may correct errors of the data DATA' and the system error correction code ECC' that are read from the memory core 430 based on the in-memory error correction code ECC_IN_MEMORY read from the memory core 430. The data DATA and the system error correction code ECC whose errors are corrected by the in-memory error correction circuit 420 may be transferred from the memory device 320 to the memory controller 310. The in-memory error correction circuit 420 is able to correct a 1-bit error which occurs in the memory device 320.

The circuits 410 and 420 for in-memory error correction are for performing an error correction operation of the memory device 320 itself, and the error correction operation may be performed hidden to the memory controller 310. In other words, the memory controller 310 may not be aware whether an additional in-memory error correction code ECC_IN_MEMORY is stored in the memory device 320. Also, the memory controller 310 may not be aware whether an in-memory error correction operation is performed internally in the memory device 320.

Since the error correction operation of the in-memory error correction circuit 420 may have to be performed hidden within a short period of time, its error correction capability is inevitably small. For example, the in-memory error correction circuit 420 may correct an error of up to one bit only. Furthermore, when an error exceeding the error correction capability of the in-memory error correction circuit 420 occurs, errors caused by malfunction may be rather increased. For example, in the case where a 2-bit error occurs, the in-memory error correction circuit 420 may not correct the 2-bit error and may increase the number of the bits of the error to 3 bits.

Differently from the memory system 200 of FIGS. 1 and 2, the malfunction of the in-memory error correction circuit 420 in the memory system 300 of FIGS. 3 and 4 may cause concerns, which will be described below with reference to FIGS. 5A and 5B, and those concerns will be addressed later in the description with references to FIGS. 6 and 7.

Figure 5A:
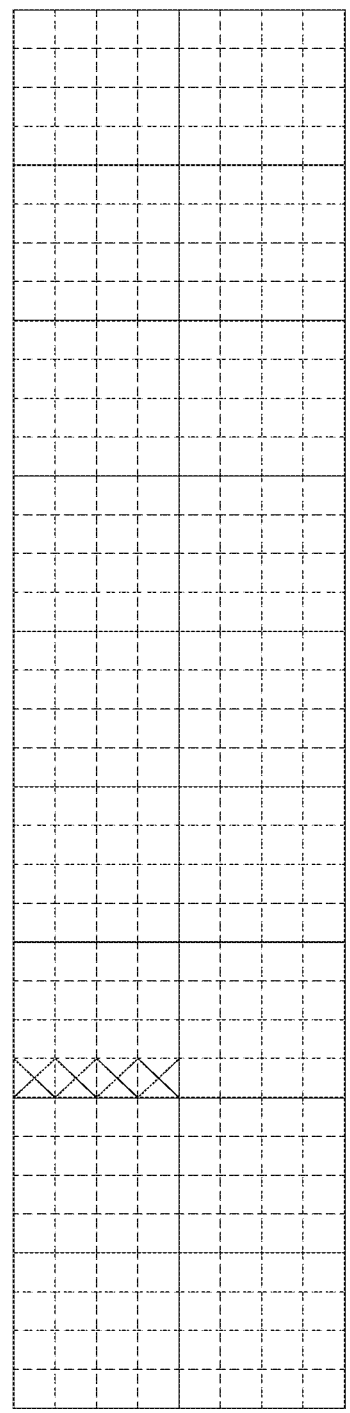
FIGS. 5A and 5B are diagrams for describing an operation of an in-memory error correction circuit shown in FIG. 4.

FIG. 5A shows 288-bit data DATA' and a system error correction code ECC' that are read from the memory core 430 included in the memory device 320 of the memory system 300. The 18 sections partitioned by solid lines may represent 18 symbols, respectively, and the 16 subsections partitioned by dotted lines in the respective sections may represent 16-bit data in each symbol. The four bits denoted by 'X' in the figure may represent an error bit. Referring to FIG. 5A, it may be seen that errors of four bits are included in one symbol.

Figure 5B:
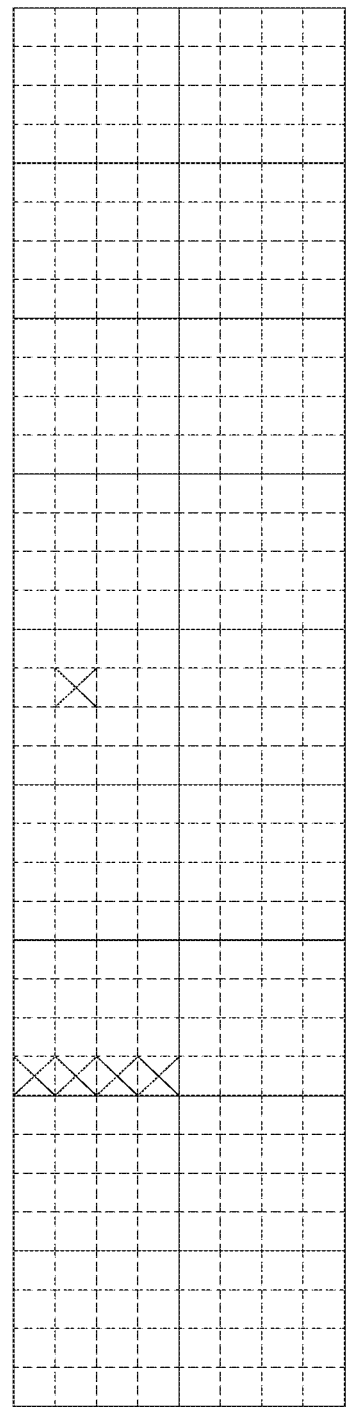

FIG. 5B illustrates data DATA and a system error correction code ECC after the in-memory error correction circuit 420 performs an error correction operation onto the data DATA' and the system error correction code ECC' of FIG. 5A based on an in-memory error correction code ECC_IN_MEMORY. Since the number of bits of error exceeds the error correctable number of bits of the in-memory error correction circuit 420, it may be seen that an error of one-bit is rather increased due to the error correction operation of the in-memory error correction circuit 420. In FIG. 5A, the errors of four bits are included in one symbol. However, in FIG. 5B, due to the malfunction of the in-memory error correction circuit 420, a 1-bit error may be included in another symbol in addition to the 4-bit error in the same symbol as shown in FIG. 5A.

The error correction operation of the in-memory error correction circuit 420 may cause an error in the operation of the memory system 300. Since the errors are included in one symbol in FIG. 5A, the error may be corrected by the error correction operation of the error correction circuit 312 of the memory controller 310. However, in FIG. 5B, since the errors are included in two symbols, the error may not be corrected even by the error correction operation of the error correction circuit 312. In short, due to the error correction operation of the in-memory error correction circuit 420, it may not be possible to correct, even by the error correction circuit 312, the errors which may otherwise be corrected if there is no error correction operation of the in-memory error correction circuit 420.

FIG. 6 is a block diagram illustrating a memory system 600 in accordance with another embodiment of the present invention.

Referring to FIG. 6, the memory system 600 may include a memory controller 610 and a memory device 620.

The memory controller 610 may control the operations of the memory device 620, such as a read operation and a write operation, according to a request from a host. The memory controller 610 may include a system error correction code (ECC) generating circuit 611, a system error correction circuit (ECC) 612, a host interface 613, a scheduler 614, a command generator 615, and a memory interface 616.

The system error correction code generating circuit 611 may be designed and operate in the same manner as the error correction code generating circuit 311 described in FIG. 3. In other words, the system error correction code generating circuit 611 may generate a 32-bit system error correction code ECC based on 256-bit data HOST_DATA transferred from the host during a write operation. Out of the 32-bit system error correction code ECC, 16 bits may be used for a CRC code for the 256-bit data, while the remaining 16 bits may be used for a simple parity code (PARITY) for the 256-bit data and the 16-bit CRC code.

The system error correction circuit 612 may be designed and operate in the same manner as the error correction circuit 312 described in FIG. 3. In other words, the system error correction circuit 612 may correct an error of the data DATA transferred from the memory device 620, based on the system error correction code ECC transferred from the memory device 620 during a read operation.

The error correction circuit 612 may correct an error of the data DATA by detecting an error based on the CRC code and restoring the symbol based on the simple parity code. To this end, a series of operations may be repeated until no error is detected. The series of operations may include, for example, detecting whether there is an error or not through a CRC operation using the CRC code; restoring a first symbol through a parity operation based on the parity code while assuming that there is an error in the first symbol; detecting whether there is an error or not through a CRC operation after the first symbol is restored; restoring a second symbol through a parity operation based on the parity code while assuming that there is an error in the second symbol; detecting whether there is an error or not through a CRC operation after the second symbol is restored; restoring a third symbol through a parity operation based on the parity code while assuming that there is an error in the third symbol; and detecting whether there is an error or not through a CRC operation after the third symbol is restored, and so forth. In this way, the error correction circuit 612 is able to correct an error of one symbol. As a result of the error detection operation, if an error occurs after all the symbols are restored, the error correction of the system error correction circuit 612 may be determined as failure, i.e., it is impossible to correct the error.

The host interface 613 may include circuits for interface between the memory controller 610 and the host. Requests of the host may be received through the host interface 613, and processing results of the requests may be transferred to the host through the host interface 613. Various pieces of information may be transferred and received between the memory controller 610 and the host. However, FIG. 6 shows only the data HOST_DATA that are directly related to the embodiments of the present invention.

The scheduler 614 may determine the sequence of requests to be applied to the memory device 620 among the requests from the host. In order to improve the performance of the memory device 620, the scheduler 614 may make a sequence of operations to be directed to the memory device 620 from a sequence of requests received from the host different. For example, even though the host first requests for a read operation of the memory device 620 and then requests for a write operation, the sequence may be adjusted such that the write operation is performed prior to the read operation in the memory device 920. Meanwhile, the scheduler 614 may schedule a read retry operation so that a read retry operation may be performed when error correction of the system error correction circuit 612 for the data read from the memory device 620 fails.

The command generator 615 may generate commands to be applied to the memory device 620 in accordance with the sequence of the operations determined by the scheduler 614.

The memory interface 616 may include circuits for interface between the memory controller 610 and the memory device 620. A command CMD and an address ADD may be transferred from the memory controller 610 to the memory device 620 through the memory interface 616, and the data DATA and the error correction code ECC (CRC and PARITY) may be transferred and received through the memory interface 616. The memory interface 616 may also be referred to as 'a PHY interface'.

The memory device 620 may store a 288-bit code word, i.e., an 18-symbol code word, including data DATA and an error correction code ECC. The entire 18 symbols forming the code word may be stored in the memory device 620 during a single write operation, and the entire 18 symbols may be read from the memory device 620 during a single read operation. By way of example and not limitation, the memory device 620 may be a high bandwidth memory (HBM). HBM may be a memory with higher bandwidth and density than those of a general memory. The HBM may be characterized in that memory chips are stacked based on 3D-TSV technology and a large number of data pins operate to increase I/O bandwidth. In the case of the HBM, the entire code word corresponding to one write command may be written into one memory device during a write operation, and the entire code word corresponding to one read command may be read from one memory device during a read operation. The feature of the memory device 620 in the memory system 600 of FIG. 6 may be characterized in that the entire code word is written into one memory device 620 and the entire code word is read from one memory device 620. As long as those conditions are satisfied, other kinds of memories other than the HBM may be used as the memory device 620 of the memory system 600.

The memory device 620 may support a read retry operation in order to resolve the concern that is described above with reference to FIGS. 3 to 5B, in cases where errors increase due to malfunction of the in-memory error correction circuit 420 that makes it difficult for the error correction circuit 312 of the memory controller 310 to correct the errors. This will be described later.

Figure 7:
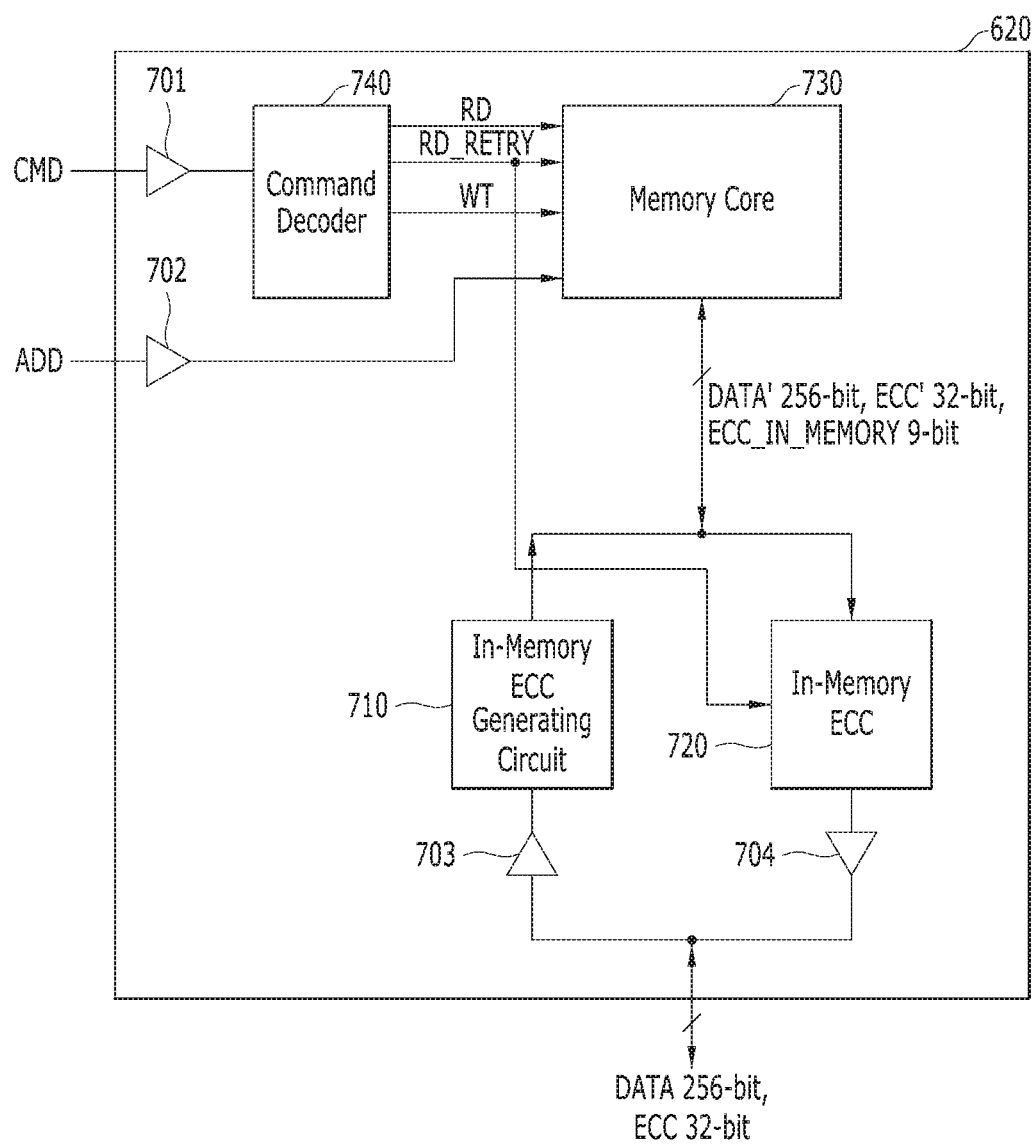
FIG. 7 is a detailed diagram of a memory device shown in FIG. 6.

FIG. 7 is a detailed diagram of the memory device 620 shown in FIG. 6.

Referring to FIG. 7, the memory device 620 may include a command receiver 701, an address receiver 702, a data receiver 703, a data transmitter 704, a command decoder 740, an in-memory error correction code (ECC) generating circuit 710, an in-memory error correction circuit (ECC) 720, and a memory core 730.

The command receiver 701 may receive a command CMD transferred from the memory controller 610. The address receiver 702 may receive an address ADD transferred from the memory controller 610. Each of the command CMD and the address ADD may include multi-bit signals.

The data receiver 703 may receive the data DATA and the system error correction code ECC from the memory controller 610, and the data transmitter 704 may transmit the data DATA and the error correction code ECC to the memory controller 610. The memory device 620 may store the data DATA and the system error correction code ECC and may not distinguish them from each other. Therefore, the data DATA and the system error correction code ECC may be collectively referred to as data. In other words, the data communicated between the memory device 620 and the memory controller 610 may include raw data DATA and the system error correction code ECC.

The command decoder 740 may decode the command CMD received through the command receiver 701 to generate a read signal RD, a read retry signal RD_RETRY, and a write signal WT. The read signal RD may be activated when a read operation is issued through the command CMD, and the read retry signal RD_RETRY may be activated when a read retry operation is issued through the command CMD. The write signal WT may be activated when a write operation is issued through the command CMD.

The in-memory error correction code generating circuit 710 may generate an in-memory error correction code ECC_IN_MEMORY for correcting an error of the error correction code ECC and the data DATA received through the data receiver 703. For example, the in-memory error correction code generating circuit 710 may generate a 9-bit in-memory error correction code ECC_IN_MEMORY based on 256-bit data and a 32-bit error correction code, i.e., a message of a total of 288 bits. In an embodiment, the in-memory error correction code ECC_IN_MEMORY may include a Hamming code. During a write operation, since no error correction operation is performed, the data DATA and the system error correction code ECC received by the data receiver 703 may be the same as the data DATA' and the system error correction code ECC' transferred to the memory core 730.

The memory core 730 may include a plurality of cell arrays and circuits for writing the data DATA', the system error correction code ECC', and the in-memory error correction code ECC_IN_MEMORY into the cell arrays and for reading the data DATA', the system error correction code ECC', and the in-memory error correction code ECC_IN_MEMORY from the cell arrays. When the write signal WT is activated, the data DATA', the system error correction code ECC', and the in-memory error correction code ECC_IN_MEMORY may be stored in the area designated by the address ADD received through the address receiver 702. When the read signal RD or the read retry signal RD_RETRY is activated, the data DATA', the system error correction code ECC', and the in-memory error correction code ECC_IN_MEMORY may be read from the area of the memory core 730 designated by the address ADD.

The in-memory error correction circuit 720 may correct errors of the data DATA' and the system error correction code ECC' that are read from the memory core 730 based on the in-memory error correction code ECC_IN_MEMORY read from the memory core 730 during a read operation. The data DATA and the system error correction code ECC whose errors are corrected by the in-memory error correction circuit 720 may be transmitted to the memory controller 610 through the data transmitter 704. The in-memory error correction circuit 720 may have a lower error correction capability than the system error correction circuit 612 of the memory controller 610. For example, the in-memory error correction circuit 720 is able to correct an error of up to 1 bit. When an error of two bits or more occurs, the number of error bits may be rather increased due to an additional error caused by the erroneous correction.

The error correction function of the in-memory error correction circuit 720 may be disabled during a read retry operation in which the read retry signal RD_RETRY is activated, and the in-memory error correction circuit 720 may bypass the data DATA' and the system error correction code ECC' as they are read from the memory core 730 to transfer to the data transmitter 704. In other words, during a read retry operation, the data DATA' and the system error correction code ECC' read from the memory core 730 may be transmitted to the memory controller 610 without error correction. In this case, the data DATA' is the same as the data DATA, and the system error correction code ECC' is the same as the error correction code ECC.

Figure 8:
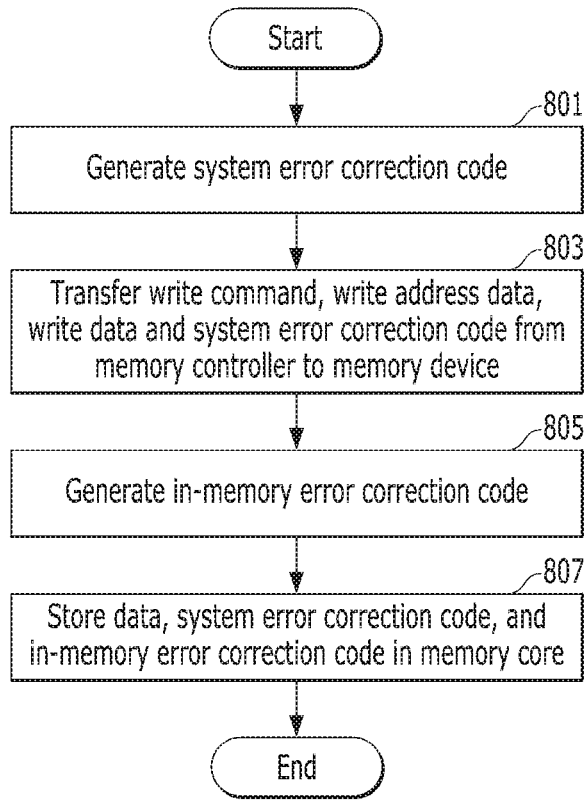
FIG. 8 is a flowchart for describing a write operation of the memory system shown in FIG. 6, including the memory device shown in FIG. 7.

FIG. 8 is a flowchart for describing a write operation of the memory system 600 shown in FIG. 6, including the memory device 620 shown in FIG. 7.

Referring to FIG. 8, the system error correction code generating circuit 611 of the memory controller 610 may generate a system error correction code ECC based on a write data HOST_DATA transferred from the host in step S801.

A write command as the command CMD, a write address as the address ADD, a write data DATA, and a system error correction code ECC may be transferred from the memory controller 610 to the memory device 620 in step S803.

The in-memory error correction code generating circuit 710 of the memory device 620 may generate an in-memory error correction code ECC_IN_MEMORY for correcting errors of the write data DATA and the system error correction code ECC, based on the write data DATA and the system error correction code ECC in step S805.

The write data DATA', the system error correction code ECC', and the in-memory error correction code ECC_IN_MEMORY may be stored in the area designated by the write address ADD in the memory core 730 of the memory device 620 in step S807. During the write operation, since the error correction operation is not performed, the data DATA' is the same as the data DATA, and the system error correction code ECC' is the same as the error correction code ECC. During the write operation, the command decoder 740 may activate the write signal WT, and the memory core 730 may perform the write operation in response to the activated write signal WT.

Figure 9:
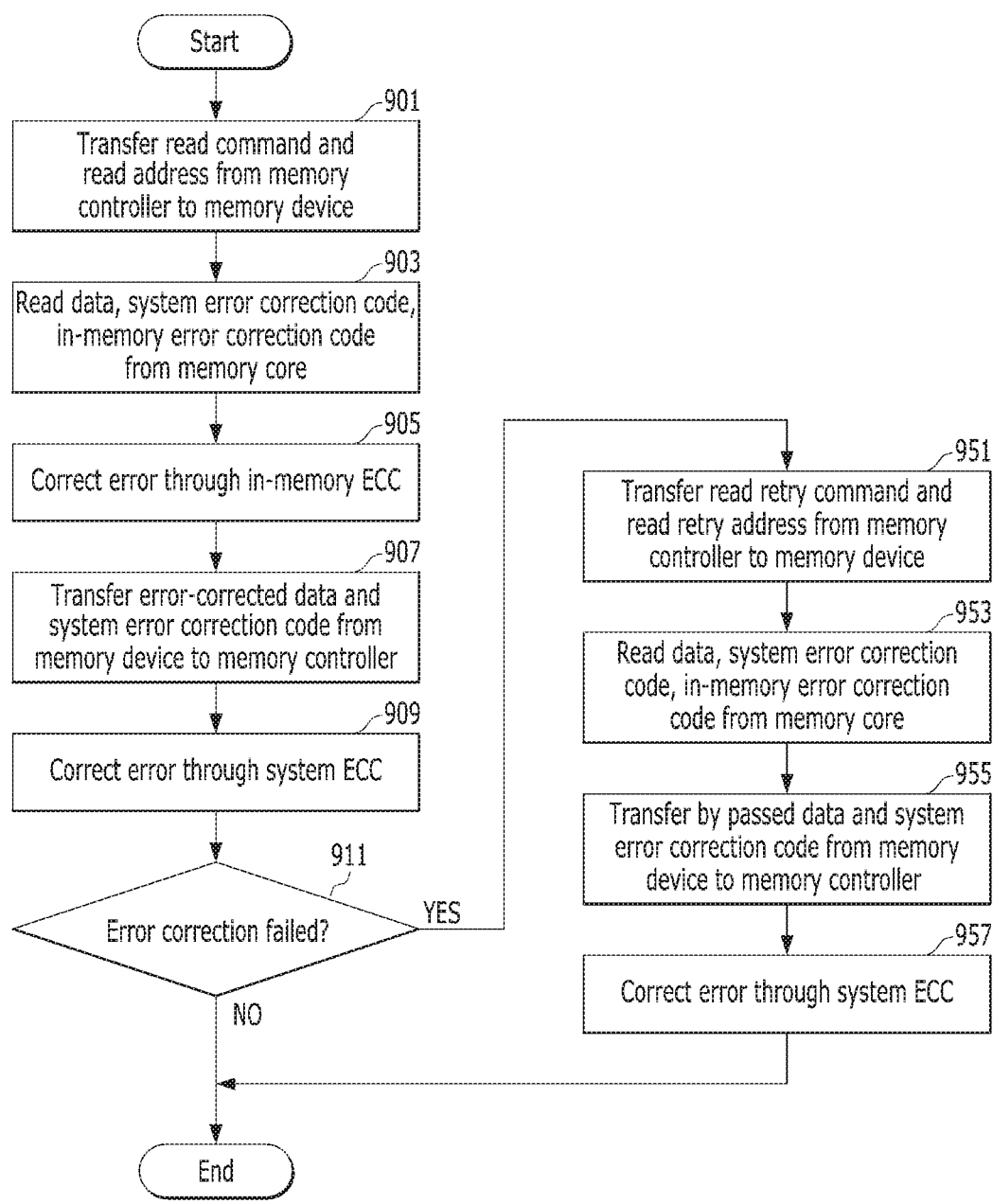
FIG. 9 is a flowchart for describing a read operation and a read retry operation of the memory system shown in FIG. 6, including the memory device shown in FIG. 7.

FIG. 9 is a flowchart for describing a read operation and a read retry operation of the memory system 600 shown in FIG. 6, including the memory device 620 shown in FIG. 7.

Referring to FIG. 9, a read command as the command CMD and a read address as the address ADD may be transferred from the memory controller 610 to the memory device 620 in step S901.

The command decoder 740 of the memory device 620 may activate the read signal RD, and the data DATA', the system error correction code ECC', and the in-memory error correction code ECC_IN_MEMORY may be read from the area of the memory core 730, designated by the read address ADD in step S903.

The in-memory error correction circuit 720 of the memory device 620 may correct the errors of the data DATA' and the system error correction code ECC' based on the in-memory error correction code ECC_IN_MEMORY in step S905.

The data transmitter 704 of the memory device 620 may transmit the data DATA and the system error correction code ECC whose errors are corrected by the in-memory error correction circuit 720 to the memory controller 610 in step S907.

The system error correction circuit 612 of the memory controller 610 may correct the error of the data DATA based on the system error correction code ECC in step S909.

In step S911, it is determined whether the error correction the error correction operation of the system error correction circuit 612 fails.

When it is determined whether the error correction operation of the system error correction circuit 612 is not a failure (NO in step S911), that is, when the errors are corrected, the read operation between the memory controller 610 and the memory device 620 may be terminated, and then the memory controller 610 may provide the host with the error-corrected data.

Meanwhile, when it is determined that the error correction operation of the system error correction circuit 612 fails (YES in step S911), that is, when error correction is determined to be impossible, read retry operations may be performed in steps S951 to S957.

In step S951, a read retry command as the command CMD and a read retry address as the address ADD may be transferred from the memory controller 610 to the memory device 620. Herein, the read retry address may be the same as the address in the read operation performed earlier.

In step S953, the command decoder 740 of the memory device 620 may activate the read retry signal RD_RETRY, and the data DATA', the code ECC', and the in-memory error correction code ECC_IN_MEMORY may be read from the area of the memory core 730, designated by the read retry address ADD. Since the in-memory error correction code ECC_IN_MEMORY is not used in the read retry operation, the in-memory error correction code ECC_IN_MEMORY may not be read.

Since the error correction function of the in-memory error correction circuit 720 is disabled when the read retry signal RD_RETRY is activated, the in-memory error correction circuit 720 may bypass the data DATA' and the system error correction code ECC' as they are to transfer to the data transmitter 704. In other words, the data DATA' is the same as the data DATA, and the system error correction code ECC' is the same as the error correction code ECC. The data transmitter 704 may transmit the bypassed data DATA and system error correction code ECC to the memory controller 610 in step S955.

The system error correction circuit 612 of the memory controller 610 may correct the error of the bypassed data DATA based on the system error correction code ECC in step S957. In this way, the read retry operation between the memory controller 610 and the memory device 620 may be terminated, and then the error-corrected data DATA may be provided to the host.

During the read retry operation, a read operation may be performed while the error correction function of the in-memory error correction circuit 720 is disabled. Therefore, it is possible to resolve a situation in which a failure occurs in the error correction operation of the system error correction circuit 612 of the memory controller 610 due to the erroneous correction of the in-memory error correction circuit 720 during the read operation. In other words, the failure of the error correction operation of the system error correction circuit 612 of the memory controller 610, which occurs for the reason described with reference to FIGS. 5A and 5B, may be resolved.

Figure 10:
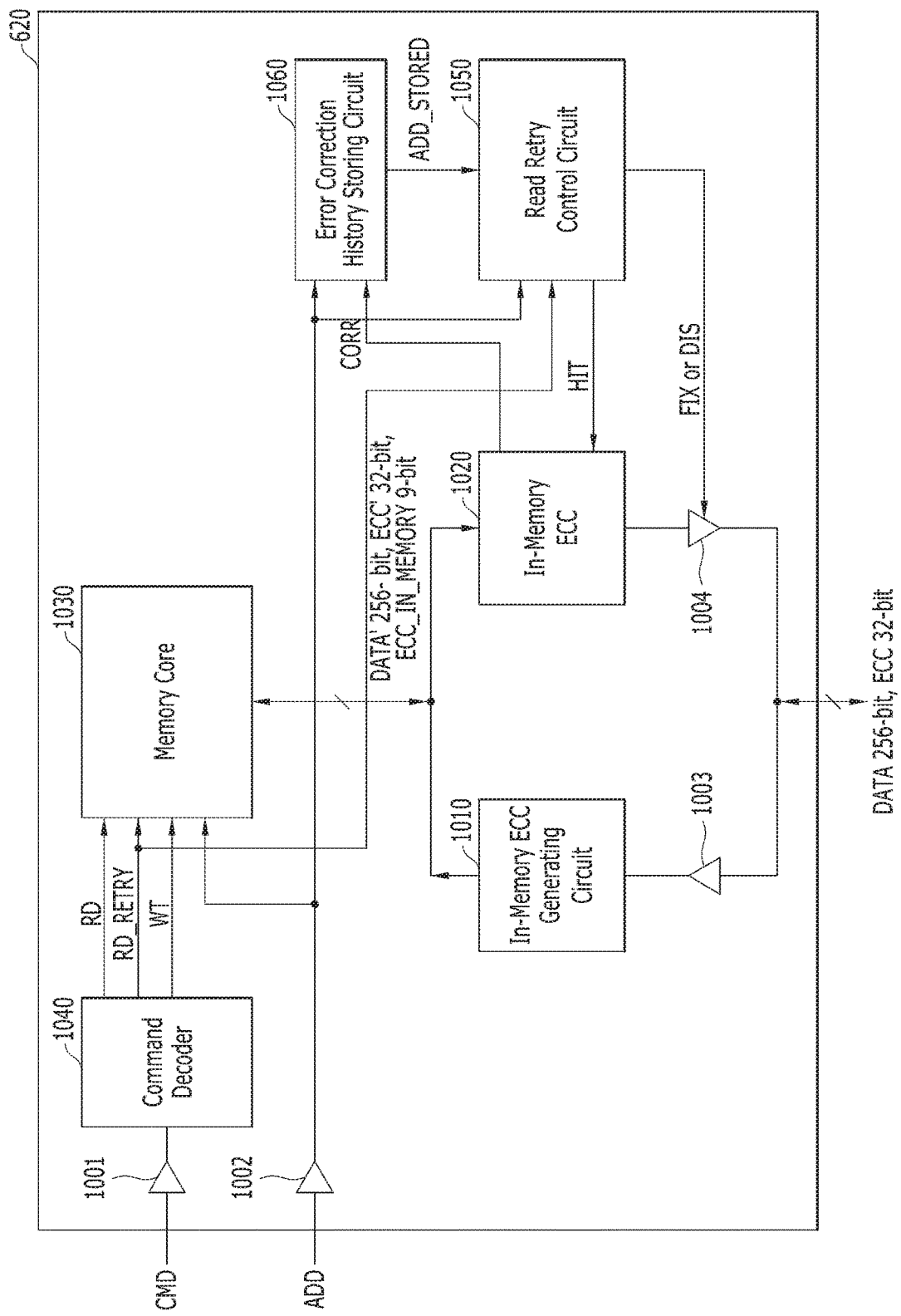
FIG. 10 is another detailed diagram of the memory device shown in FIG. 6.

FIG. 10 is another detailed diagram of the memory device 620 shown in FIG. 6.

Referring to FIG. 10, the memory device 620 may include a command receiver 1001, an address receiver 1002, a data receiver 1003, a data transmitter 1004, a command decoder 1040, an in-memory error correction code (ECC) generating circuit 1010, an in-memory error correction circuit (ECC) 1020, a memory core 1030, an error correction history storing circuit 1060, and a read retry control circuit 1050.

The command receiver 1001 may receive the command CMD transferred from the memory controller 610. The address receiver 1002 may receive the address ADD transferred from the memory controller 610. Each of the command CMD and the address ADD may include multi-bit signals.

The data receiver 1003 may receive the data DATA and the system error correction code ECC from the memory controller 610, and the data transmitter 1004 may transmit the data DATA and the error correction code ECC to the memory controller 610. The memory device 620 may store the data DATA and the system error correction code ECC, and may not distinguish them from each other. Therefore, the data DATA and the system error correction code ECC may be collectively referred to as data. In other words, the data communicated between the memory device 620 and the memory controller 610 may include raw data DATA and the system error correction code ECC.

The command decoder 1040 may decode the command CMD received through the command receiver 1001 to generate a read signal RD, a read retry signal RD_RETRY, and a write signal WT. The read signal RD may be activated when a read operation is issued through the command CMD, and the read retry signal RD_RETRY may be activated when a read retry operation is issued through the command CMD.

The write signal WT may be activated when a write operation is issued through the command CMD.

The in-memory error correction code generating circuit 1010 may generate an in-memory error correction code ECC_IN_MEMORY for correcting an error of the error correction code ECC and the data DATA received through the data receiver 1003. For example, the in-memory error correction code generating circuit 1010 may generate a 9-bit in-memory error correction code ECC_IN_MEMORY based on 256-bit data and a 32-bit error correction code, i.e., a message of a total of 288 bits. In an embodiment, the in-memory error correction code ECC_IN_MEMORY may include a Hamming code. During a write operation, since no error correction operation is performed, the data DATA and the system error correction code ECC received by the data receiver 1003 may be the same as the data DATA' and the system error correction code ECC' transferred to the memory core 1030.

The memory core 1030 may include a plurality of cell arrays and circuits for writing the data DATA', the system error correction code ECC', and the in-memory error correction code ECC_IN_MEMORY into the cell arrays and for reading the data DATA', the system error correction code ECC', and the in-memory error correction code ECC_IN_MEMORY from the cell arrays. When the write signal WT is activated, the data DATA', the system error correction code ECC', and the in-memory error correction code ECC_IN_MEMORY may be stored in the area designated by the address ADD received through the address receiver 1002. When the read signal RD or the read retry signal RD_RETRY is activated, the data DATA', the system error correction code ECC', and the in-memory error correction code ECC_IN_MEMORY may be read from the area of the memory core 1030, designated by the address ADD.

The in-memory error correction circuit 1020 may correct errors of the data DATA' and the system error correction code ECC' that are read from the memory core 1030, based on the in-memory error correction code ECC_IN_MEMORY read from the memory core 1030 when a hit signal HIT is deactivated. The data DATA and the system error correction code ECC whose errors are corrected by the in-memory error correction circuit 1020 may be transmitted to the memory controller 610 through the data transmitter 1004. The in-memory error correction circuit 1020 may have a lower error correction capability than the system error correction circuit 612 of the memory controller 610. For example, the in-memory error correction circuit 1020 is able to correct an error of up to 1 bit. When an error of two bits or more occurs, the number of error bits may be rather increased due to an additional error caused by the erroneous correction.

The error correction history storing circuit 1060 may store the address ADD of a read operation when the in-memory error correction circuit 1020 detects and corrects the error during the read operation. When the in-memory error correction circuit 1020 detects and corrects an error during a read operation, the in-memory error correction circuit 1020 may activate a correction signal CORR to notify the error correction history storing circuit 1060 that the error is corrected. Then, the error correction history storing circuit 1060 may store the address ADD in response to the activated correction signal CORR.

The read retry control circuit 1050 may compare the address ADD received for a read retry operation with the address ADD_STORED stored in the error correction history storing circuit 1060 during the read retry operation in which the read retry signal RD_RETRY is activated. When the read retry address ADD and the address ADD_STORED stored in the error correction history storing circuit 1060 are the same, the read retry control circuit 1050 may activate the hit signal HIT. When the read retry address ADD is different from the address ADD_STORED stored in the error correction history storing circuit 1060, the read retry control circuit 1050 may be designed to perform one among the following (1) to (3). (1) is to deactivate the hit signal HIT; (2) is to deactivate the hit signal HIT and activate a fixation signal FIX; and (3) is to deactivate the hit signal HIT and activate a disable signal DIS.

When the hit signal HIT is activated, the in-memory error correction circuit 1020 may directly bypass the data DATA' and the system error correction code ECC' as they are to transfer to the data transmitter 1004. In other words, when the hit signal HIT is activated, the data DATA' and the system error correction code ECC' that are read from the memory core 1030 may be transferred to the data transmitter 1004 without error correction. In this case, the data DATA' is the same as the data DATA, and the system error correction code ECC' is the same as the error correction code ECC.

When the hit signal HIT is activated, the data transmitter 1004 may transmit the data DATA and the system error correction code ECC that are bypassed by the in-memory error correction circuit 1020 to the memory controller 620.

When the hit signal HIT is deactivated and the fixation signal FIX is activated, the data transmitter 1004 may transmit a signal fixed to '1' or fixed to '0' to the memory controller 620. Also, the data transmitter 1004 may not output any data (signal) to the memory controller 620 when the hit signal HIT is deactivated and the disable signal DIS is activated.

Figure 11:
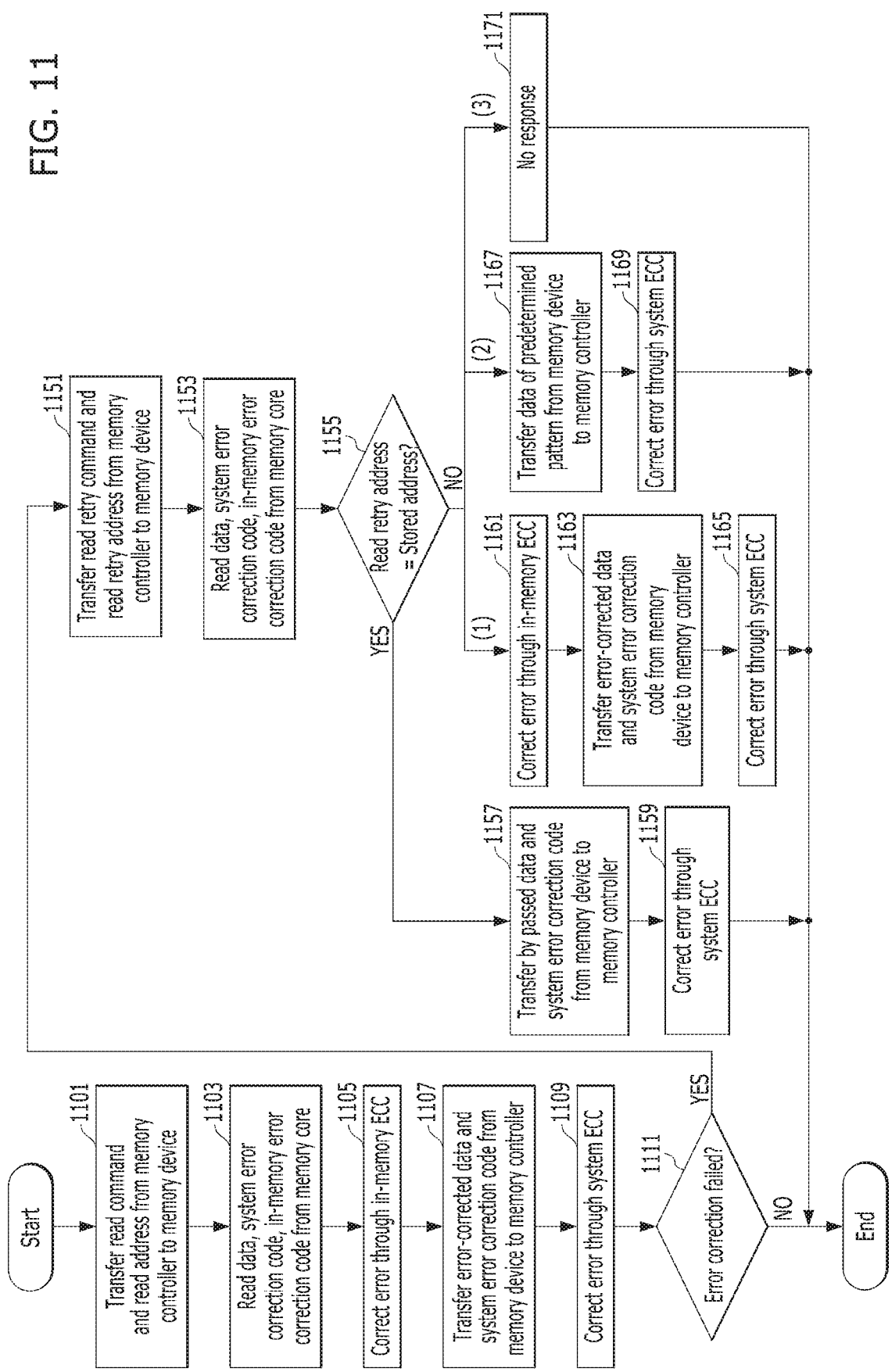
FIG. 11 is a flowchart for describing a read operation and a read retry operation of the memory system shown in FIG. 6, including the memory device shown in FIG. 10.

FIG. 11 is a flowchart for describing a read operation and a read retry operation of the memory system 600 shown in FIG. 6, including the memory device 620 shown in FIG. 10. Even though the memory device 620 is formed as shown in FIG. 10, a write operation of the memory system 600 may be performed in the same manner as shown in FIG. 8. Therefore, illustration and description for the write operation will be omitted herein.

Referring to FIG. 11, a read command as the command CMD and a read address as the address ADD may be transferred from the memory controller 610 to the memory device 620 in step S1101.

The command decoder 1040 of the memory device 620 may activate the read signal RD, and the data DATA', the system error correction code ECC', and the in-memory error correction code ECC_IN_MEMORY may be read from the area of the memory core 1030, designated by the read address ADD in step S1103.

The in-memory error correction circuit 1020 of the memory device 620 may correct errors of the data DATA' and the system error correction code ECC' based on the in-memory error correction code ECC_IN_MEMORY in step S1105. Herein, when an error is detected and corrected, the read address ADD may be stored in the error correction history storing circuit 1060.

The data transmitter 1004 of the memory device 620 may transmit the data DATA and the system error correction code ECC whose errors are corrected by the in-memory error correction circuit 1020 to the memory controller 610 in step S1107.

The system error correction circuit 612 of the memory controller 610 may correct an error of the data DATA based on the system error correction code ECC in step S1109.

In step S1111, it is determined whether the error correction the error correction operation of the system error correction circuit 612 fails.

When it is determined whether the error correction operation of the system error correction circuit 612 is not a failure (NO in step S1111), that is, when the error is corrected, the read operation between the memory controller 610 and the memory device 620 may be terminated, and then the memory controller 610 may provide the host with the error-corrected data.

Meanwhile, when it is determined that the error correction operation of the system error correction circuit 612 is a failure (YES in step S1111), that is, when error correction is determined to be impossible, the read retry operations may be performed in steps S1151 to S1171.

In step S1151, a read retry command as the command CMD and a read retry address as the address ADD may be transferred from the memory controller 610 to the memory device 620. Herein, the read retry address may be the same as that of the read operation performed earlier.

In step S1153, the command decoder 1040 of the memory device 620 may activate the read retry signal RD_RETRY, and the data DATA', the system error correction code ECC', and the in-memory error correction code ECC_IN_MEMORY may be read from the area of the memory core 1030, designated by the read retry address ADD.

The read retry control circuit 1050 of the memory device 620 may compare the read retry address ADD with the address ADD_STORED stored in the error correction history storing circuit 1060 in step S1155.

When the read retry address ADD and the address ADD_STORED stored in the error correction history storing circuit 1060 are the same (YES in step S1155), the read retry control circuit 1050 may activate the hit signal HIT. In response to the activated hit signal HIT, the read retry control circuit 1050 may bypass the data DATA' and the system error correction code ECC' as they are read from the memory core 1030 to transfer to the data transmitter 1004. In short, the data DATA' is the same as the data DATA, and the system error correction code ECC' is the same as the error correction code ECC. The data transmitter 1004 may transmit the bypassed data DATA and system error correction code ECC to the memory controller 610 in step S1157.

The system error correction circuit 612 of the memory controller 610 may correct the error of the bypassed data DATA based on the system error correction code ECC in step S1159. As a result, the read retry operation between the memory controller 610 and the memory device 620 may be terminated, and then the error-corrected data may be provided to the host.

When the read retry address ADD is different from the address ADD_STORED stored in the error correction history storing circuit 1060 (NO in the step S1155), one among the following (1) to (3) may be performed.

(1) When the read retry address ADD is different from the address ADD_STORED stored in the error correction history storing circuit 1060 (NO in step S1155), the read retry control circuit 1050 may deactivate the hit signal HIT. In response to the deactivated hit signal HIT, the in-memory error correction circuit 1020 may correct the errors of the data DATA' and the system error correction code ECC' that are read from the memory core 1030, based on the in-memory error correction code ECC_IN_MEMORY which is read from the memory core 1030 in step S1161. Then, the data transmitter 1004 may transmit the data and the system error correction code whose errors are corrected by the in-memory error correction circuit 1020 to the memory controller in step S1163. The system error correction circuit 612 of the memory controller 610 may correct the error of the data DATA based on the system error correction code ECC in step S1165. In this case, the in-memory error correction operation of the memory device 620 may be performed as it is during the read retry operation, and the read retry operation may be performed in the same manner as the read operation.

(2) When the read retry address ADD is different from the address ADD_STORED stored in the error correction history storing circuit 1060 (NO in step S1155), the read retry control circuit 1050 may deactivate the hit signal HIT and activate the fixation signal FIX. The data transmitter 1004 may transmit the data of a predetermined pattern (e.g., a pattern fixed to '1' or fixed to '0') to the memory controller 610 in response to the activated fixation signal FIX in step S1167. In other words, the data transmitter 1004 may transmit the data of the predetermined pattern instead of the data DATA and the error correction code ECC. Although, the system error correction circuit 612 of the memory controller 610 may try to correct the error in step S1169, but the result of the error correction may naturally fail since a valid data and the error correction code are not received from the memory device 620.

(3) When the read retry address ADD is different from the address ADD_STORED stored in the error correction history storing circuit 1060 (NO in step S1155), the read retry control circuit 1050 may deactivate the hit signal HIT and activate the disable signal DIS. The data transmitter 1004 may be disabled in response to the activated disable signal DIS, and after all the memory device 620 may terminate a read retry operation by not responding to the read retry command of the memory controller 610 (S1171).

Referring to FIG. 11, only when the read retry address ADD coincides with the address ADD_STORED stored in the error correction history storing circuit 1060 during the read retry operation, that is, only when there is a possibility that a failure was occurred during an error correction operation of the memory controller 610 by an in-memory error correction operation, the read operation may be performed while the in-memory error correction operation is disabled. If the two addresses ADD and ADD_STORED do not coincide with each other during the read retry operation, the in-memory error correction operation may not be disabled or the read retry operation may be terminated with no response to the read retry command.

This may prevent the unintended revelation of the actual error rate of the memory device 620 through the read retry operation while the in-memory error correction function of the memory device 620 is disabled. The memory manufacturers have added an in-memory error correction function to conceal the errors that occur in the manufactured memory devices. However, a situation where users arbitrarily disables the in-memory error correction function, and thereby figuring out the actual error rate of the memory devices, may not be desired by the memory manufacturers.

Figure 12:
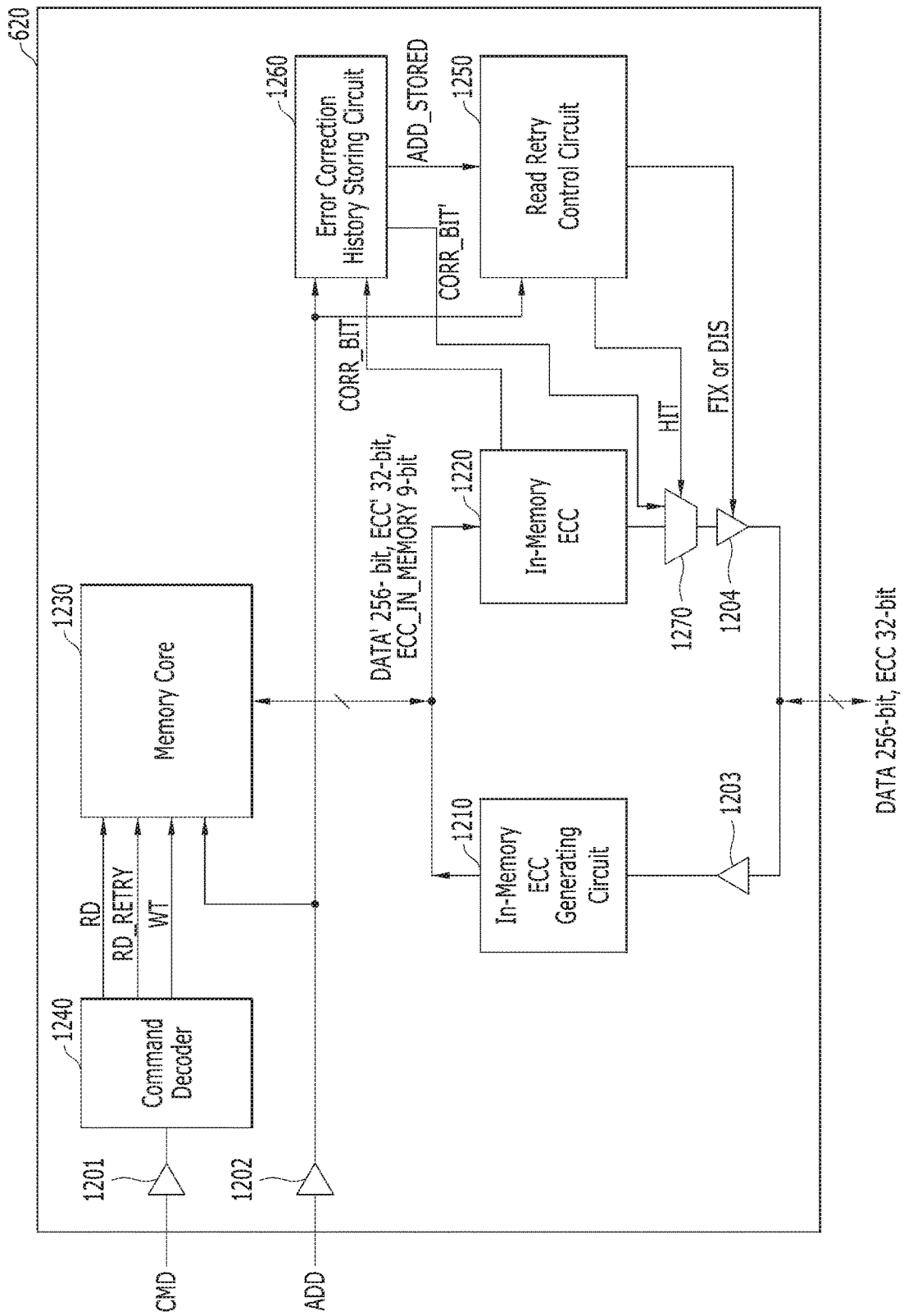
FIG. 12 is yet another detailed diagram of the memory device shown in FIG. 6.

FIG. 12 is yet another detailed diagram of the memory device 620 shown in FIG. 6.

Referring to FIG. 12, the memory device 620 may include a command receiver 1201, an address receiver 1202, a data receiver 1203, a data transmitter 1204, a command decoder 1240, an in-memory error correction code (ECC) generating circuit 1210, an in-memory error correction circuit (ECC) 1220, a memory core 1230, an error correction history storing circuit 1260, a read retry control circuit 1250, and a multiplexer 1270.

The command receiver 1201 may receive a command CMD transferred from the memory controller 610. The address receiver 1202 may receive an address ADD transferred from the memory controller 610. Each of the command CMD and the address ADD may include multi-bit signals.

The data receiver 1203 may receive data DATA and a system error correction code ECC from the memory controller 610. The data transmitter 1204 may transmit signals received from the multiplexer 1270 to the memory controller 610. The memory device 620 may only store the data DATA and the system error correction code ECC, and may not distinguish them from each other. Therefore, the data DATA and the system error correction code ECC may be collectively referred to as data. In other words, the data communicated between the memory device 620 and the memory controller 610 may include raw data DATA and the system error correction code ECC.

The command decoder 1240 may decode the command CMD received through the command receiver 1201 to generate a read signal RD, a read retry signal RD_RETRY and a write signal WT. The read signal RD may be activated when a read operation is issued through the command CMD, and the read retry signal RD_RETRY may be activated when a read retry operation is issued through the command CMD. The write signal WT may be activated when a write operation is issued through the command CMD.

The in-memory error correction code generating circuit 1210 may generate an in-memory error correction code ECC_IN_MEMORY for correcting an error of the error correction code ECC and the data DATA received through the data receiver 1203. For example, the in-memory error correction code generating circuit 1210 may generate a 9-bit in-memory error correction code ECC_IN_MEMORY based on 256-bit data and a 32-bit error correction code, i.e., a message of a total of 288 bits. In an embodiment, the in-memory error correction code ECC_IN_MEMORY may include a Hamming code. During a write operation, since no error correction operation is performed, the data DATA and the system error correction code ECC received by the data receiver 1203 may be the same as the data DATA' and the system error correction code ECC' transferred to the memory core 1230.

The memory core 1230 may include a plurality of cell arrays and circuits for writing the data DATA', the system error correction code ECC', and the in-memory error correction code ECC_IN_MEMORY into the cell arrays and for reading the data DATA', the system error correction code ECC', and the in-memory error correction code ECC_IN_MEMORY from the cell arrays. When the write signal WT is activated, the data DATA', the system error correction code ECC', and the in-memory error correction code ECC_IN_MEMORY may be stored in the area designated by the address ADD received through the address receiver 1202. When the read signal RD or the read retry signal RD_RETRY is activated, the data DATA', the system error correction code ECC', and the in-memory error correction code ECC_IN_MEMORY may be read from the area of the memory core 1230, designated by the address ADD.

The in-memory error correction circuit 1220 may correct errors of the data DATA' and the system error correction code ECC' that are read from the memory core 1230, based on the in-memory error correction code ECC_IN_MEMORY read from the memory core 1230. The data DATA and the system error correction code ECC whose errors are corrected by the in-memory error correction circuit 1220 may be transferred to the multiplexer 1270. The in-memory error correction circuit 1220 may have a lower error correction capability than the system error correction circuit 612 of the memory controller 610. For example, the in-memory error correction circuit 1220 is able to correct an error of up to 1 bit. When an error of two bits or more occurs, the number of error bits may be rather increased due to an additional error caused by the erroneous correction.

The error correction history storing circuit 1260 may store an error correction bit and the address ADD of a read operation when the in-memory error correction circuit 1220 detects and corrects the error during the read operation. When the in-memory error correction circuit 1220 detects and corrects an error during a read operation, the in-memory error correction circuit 1220 may transfer error correction bit information CORR_BIT to the error correction history storing circuit 1260, and the error correction history storing circuit 1260 may store the address ADD and the error correction bit information CORR_BIT. Herein, the error correction bit information CORR_BIT may represent which bit of the data DATA' and the system error correction code ECC' is corrected by the in-memory error correction circuit 1220.

The read retry control circuit 1250 may compare the read retry address ADD received for a read retry operation with the address ADD_STORED stored in the error correction history storing circuit 1260 during the read retry operation in which the read retry signal RD_RETRY is activated. When the read retry address ADD and the address ADD_STORED stored in the error correction history storing circuit 1260 are the same, the read retry control circuit 1250 may activate a hit signal HIT. When the read retry address ADD is different from the address ADD_STORED stored in the error correction history storing circuit 1260, the read retry control circuit 1250 may perform one among the following (1) to (3). (1) is to deactivate the hit signal HIT; (2) is to deactivate the hit signal HIT and activate a fixation signal FIX; and (3) is to deactivate the hit signal HIT and activate a disable signal DIS.

When the hit signal HIT is deactivated, the multiplexer 1270 may transfer the data DATA and the error correction code ECC whose errors are corrected by the in-memory error correction circuit 1220 to the data transmitter 1204, and when the hit signal HIT is activated, the multiplexer 1270 may select and transfer the error correction bit information CORR_BIT' stored in the error correction history storing circuit 1260 to the data transmitter 1204.

When the hit signal HIT is deactivated and the fixation signal FIX is activated, the data transmitter 1004 may transmit a signal fixed to '1' or fixed to '0' to the memory controller 620. Also, the data transmitter 1204 may not output any data (signal) to the memory controller 620 when the hit signal HIT is deactivated and the disable signal DIS is activated.

Figure 13:
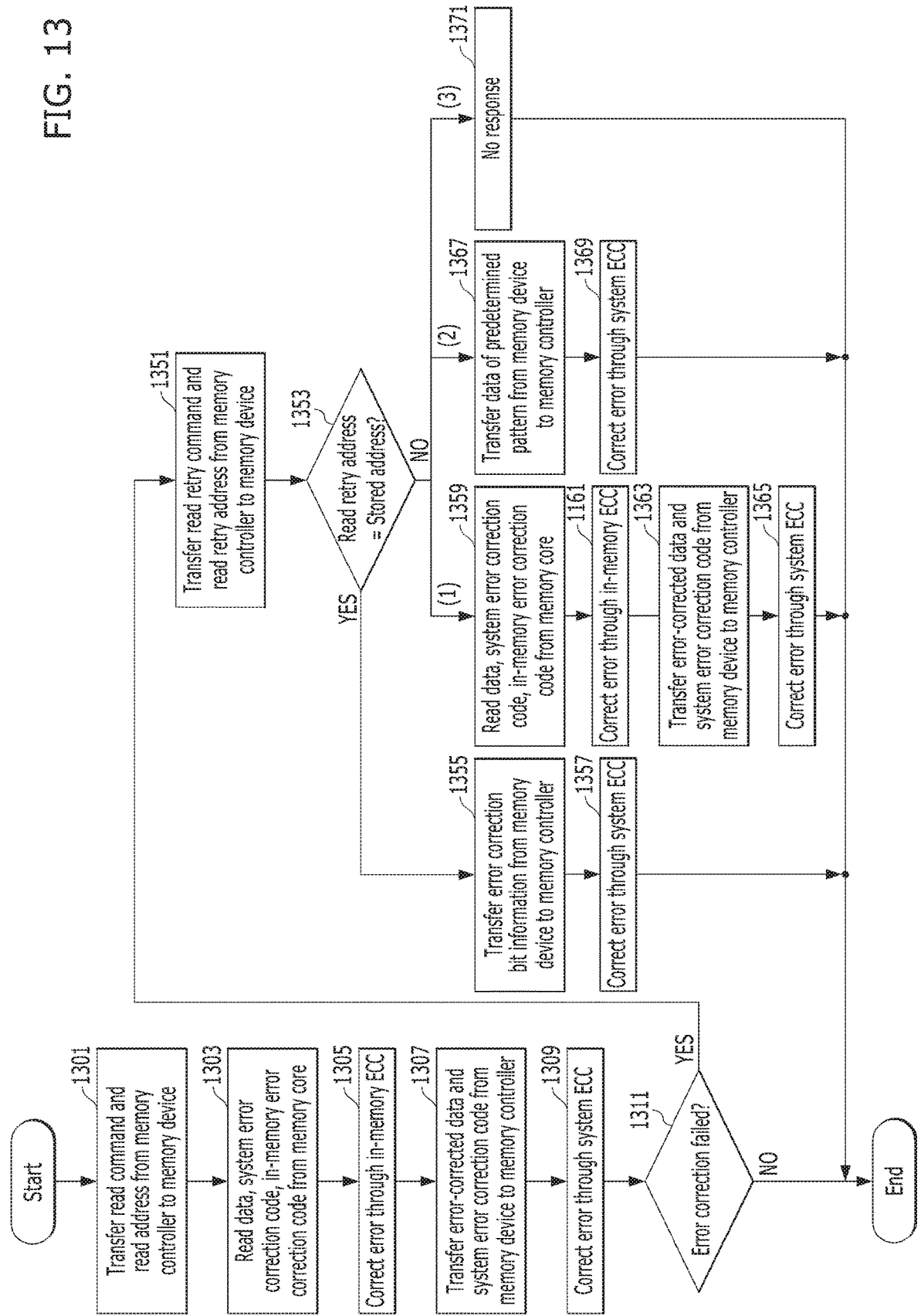
FIG. 13 is a flowchart for describing a read operation and a read retry operation of the memory system shown in FIG. 6, including the memory device shown in FIG. 12.

FIG. 13 is a flowchart for describing a read operation and a read retry operation of the memory system 600 shown in FIG. 6, including the memory device 620 shown in FIG. 12. Even when the memory device 620 is formed as shown in FIG. 12, the write operation of the memory system 600 may be performed in the same manner as in FIG. 8. Therefore, further illustration and description of the write operation will be omitted.

Referring to FIG. 13, a read command is transferred as the command CMD from the memory controller 610 to the memory device 620, and a read address is transferred as the address ADD in step S1301.

The command decoder 1240 of the memory device 620 may activate the read signal RD, and the data DATA', the system error correction code ECC', and the in-memory error correction code ECC_IN_MEMORY may be read from the area of the memory core 1230, designated by the read address ADD in step S1303.

The in-memory error correction circuit 1220 of the memory device 620 may correct the error of the data DATA' and the system error correction code ECC' based on the in-memory error correction code ECC_IN_MEMORY in step S1305. Herein, when an error is detected and corrected, the read address ADD and the error correction bit information CORR_BIT may be stored in the error correction history storing circuit 1260.

The data transmitter 1204 of the memory device 620 may transmit the data DATA and the system error correction code ECC whose errors are corrected by the in-memory error correction circuit 1220 to the memory controller 610 in step S1307.

The system error correction circuit 612 of the memory controller 610 may correct the error of the data DATA based on the system error correction code ECC in step S1309.

In step S1311, it is determined whether the error correction the error correction operation of the system error correction circuit 612 fails.

When it is determined that the error correction operation of the system error correction circuit 612 is not a failure (NO in step S1311), that is, when the error is corrected, the read operation between the memory controller 610 and the memory device 620 may be terminated, and then the memory controller 610 may provide the host with the error-corrected data.

Meanwhile, when it is determined that the error correction operation of the system error correction circuit 612 fails (YES in step S1311), that is, when error correction is determined to be impossible, the read retry operation may be performed in steps S1351 to S1371.

In step S1351, a read retry command as the command CMD and a read retry address as the address ADD may be transferred from the memory controller 610 to the memory device 620. Herein, the read retry address may be the same as the address in the read operation performed earlier.

In step S1353, the read retry control circuit 1250 of the memory device 620 may compare the read retry address ADD with the address ADD_STORED stored in the error correction history storing circuit 1260.

When the read retry address ADD and the address ADD_STORED stored in the error correction history storing circuit 1260 are the same (YES in step S1353), the read retry control circuit 1250 may activate the hit signal HIT. In response to the activated hit signal HIT, the multiplexer 1270 may select and transfer the error correction bit information CORR_BIT' stored in the error correction history storing circuit 1260 to the data transmitter 1204. The data transmitter 1204 then may transfer the error correction bit information CORR_BIT' to the memory controller 610 in step S1355.

In step S1357, the system error correction circuit 612 of the memory controller 610 may restore the data DATA and the system error correction code ECC transmitted in the read operation (step 1307) into the state before the error correction of the in-memory error correction circuit 1220 based on the error correction bit information CORR_BIT', and then perform an error correction operation on the restored data based on the restored system error correction code. If the failure of the error correction operation occurring in the previous step S1309 is caused by the erroneous correction of the in-memory error correction circuit 1220, the error correction operation of this error correction operation may be succeeded in step S1357. As a result, the read retry operation between the memory controller 610 and the memory device 620 may be terminated, and then the error-corrected data may be provided to the host.

When the read retry address ADD is different from the address ADD_STORED stored in the error correction history storing circuit 1260 (NO in step S1353), one among the following (1) to (3) may be performed.

(1) When the read retry address ADD is different from the address ADD_STORED stored in the error correction history storing circuit 1060 (NO in step S1353), the read retry control circuit 1250 may deactivate the hit signal HIT, and the data DATA', the system error correction code ECC', and the in-memory error correction code ECC_IN_MEMORY may be read from the memory core 1230 in step S1359. The in-memory error correction circuit 1220 may correct the errors of the data DATA' and the system error correction code ECC' based on the in-memory error correction code ECC_IN_MEMORY in step S1361. The multiplexer 1270 may select and transfer the data and the system error correction code whose errors are corrected by the in-memory error correction circuit 1220, to the data transmitter 1204. Then, the data transmitter 1204 may transmit the data DATA and the system error correction code ECC to the memory controller in step S1363. The system error correction circuit 612 of the memory controller 610 may correct the error of the data DATA based on the system error correction code ECC in step S1365. In this case, the in-memory error correction operation of the memory device 620 may be performed as it is during the read retry operation, and the read retry operation may be performed in the same manner as the read operation.

(2) When the read retry address ADD is different from the address ADD_STORED stored in the error correction history storing circuit 1260 (NO in step S1353), the read retry control circuit 1250 may deactivate the hit signal HIT and activate the fixation signal FIX. The data transmitter 1204 may transmit the data of a predetermined pattern (e.g., a pattern fixed to or fixed to '0') to the memory controller 610 in response to the activated fixation signal FIX in step S1367. In other words, the data transmitter 1204 may transmit the data of the predetermined pattern instead of the data DATA and the error correction code ECC. Although, the system error correction circuit 612 of the memory controller 610 may try to correct the error in step S1369, but the result of the error correction may naturally fail since a valid data and the error correction code are not received from the memory device 620.

(3) When the read retry address ADD is different from the address ADD_STORED stored in the error correction history storing circuit 1060 (NO in step S1353), the read retry control circuit 1250 may deactivate the hit signal HIT and activate the disable signal DIS. The data transmitter 1204 may be disabled in response to the activated disable signal DIS, and after all the memory device 620 may terminate a read retry operation by not responding to the read retry command of the memory controller 610 (S1371).

Referring to FIG. 13, only when the read retry address ADD coincides with the address ADD_STORED stored in the error correction history storing circuit 1260 during the read retry operation, that is, only when there is a possibility that a failure was occurred during an error correction operation of the memory controller 610 by an in-memory error correction operation, the error correction bit information CORR_BIT may be transferred from the memory device 620 to the memory controller 610. If the two addresses ADD and ADD_STORED do not coincide with each other during the read retry operation, a general read operation may be performed, or the read retry operation may be terminated with no response to the read retry command.

The read retry operation as shown in FIG. 13 may prevent users from arbitrarily disabling the in-memory error correction function of the memory device 620 to figure out the actual error rate of the memory device 620, just as shown in FIG. 11.

According to the embodiments of the present invention, the efficiency of error correction in a memory system may be increased.

While the present invention has been described with respect to the specific embodiments, it will be apparent to those skilled in the art that various changes and modifications may be made without departing from the spirit and scope of the invention as defined in the following claims.

What is claimed is:

1. A memory device, comprising:
an in-memory error correction code generating circuit suitable for generating, in a write operation, an in-memory error correction code based on data received from a memory controller;
a memory core suitable for storing the data and the in-memory error correction code;
an in-memory error correction circuit suitable for correcting, in a read operation, an error of the data which is read from the memory core, based on the in-memory error correction code which is read from the memory core;
a data transmitter suitable for, in the read operation, transmitting the data whose error is corrected by the in-memory error correction circuit to the memory controller;
an error correction history storing circuit suitable for storing an error correction history of the in-memory error correction circuit; and
a read retry control circuit suitable for comparing, in a read retry operation, an address stored in the error correction history storing circuit with a read retry address, and when the address is the same as the read retry address, controlling the data read from the memory core based on the read retry address, to be transmitted to the memory controller through the data transmitter without error correction.

2. The memory device of claim 1, wherein when the address is different from the read retry address,
the read retry control circuit controls the data read from the memory core based on the read retry address, to be error-corrected by the in-memory error correction circuit and then to be transmitted to the memory controller through the data transmitter.

3. The memory device of claim 1, wherein when the address is different from the read retry address,
the read retry control circuit controls data of a predetermined pattern to be transmitted to the memory controller through the data transmitter.

4. The memory device of claim 1, wherein when the address is different from the read retry address,
the read retry control circuit controls no data corresponding to the read retry operation to be transmitted to the memory controller through the data transmitter.

5. The memory device of claim 1, wherein the data received from the memory controller includes raw data and a system error correction code.

6. A memory system, comprising:
a memory controller; and
a memory device,
wherein the memory controller comprises:
a system error correction code generating circuit suitable for generating a system error correction code to be stored in the memory device along with a write data based on the write data; and
a system error correction circuit suitable for correcting an error of data which is read from the memory device, based on the system error correction code which is read from the memory device,
wherein the memory controller commands the memory device to perform a read retry operation when an error correction operation of the system error correction circuit fails, and
wherein the memory device comprises:
an in-memory error correction code generating circuit suitable for generating an in-memory error correction code based on the write data and the system error correction code that are received in a write operation;
a memory core suitable for storing the write data, the system error correction code, and the in-memory error correction code;
an in-memory error correction circuit suitable for correcting, in a read operation, an error of the data and the system error correction code which are read from the memory core, based on the in-memory error correction code which is read from the memory core;
a data transmitter suitable for transmitting, in the read operation, the data and the system error correction code whose errors are corrected by the in-memory error correction circuit to the memory controller;
an error correction history storing circuit suitable for storing an error correction history of the in-memory error correction circuit; and
a read retry control circuit suitable for comparing, in a read retry operation, an address stored in the error correction history storing circuit with a read retry address, and when the address and the read retry address are the same, controlling the data and the system error correction code that are read from the memory core based on the read retry address, to be transmitted to the memory controller through the data transmitter without error correction.

7. The memory system of claim 6, wherein when the address and the read retry address are different from each other,
the read retry control circuit controls the data which is read from the memory core based on the read retry address, to be error-corrected by the in-memory error correction circuit and then to be transmitted to the memory controller through the data transmitter.

8. The memory system of claim 6, wherein when the address and the read retry address are different from each other,
the read retry control circuit controls data of a predetermined pattern to be transmitted to the memory controller through the data transmitter.

9. The memory system of claim 6, wherein when the address and the read retry address are different from each other,
the read retry control circuit controls no data corresponding to the read retry operation to be transmitted to the memory controller through the data transmitter.

10. The memory system of claim 6, wherein the in-memory error correction circuit has a lower error correction capability than the system error correction circuit.

11. The memory system of claim 6, wherein the memory device includes a High Bandwidth Memory (HBM).

12. A method for operating a memory system including a memory device and a memory controller, the method comprising:

reading, by the memory device, a data, a system error correction code, and an in-memory error correction code which are stored in the memory device, based on a read command and a read address transferred from the memory controller;

correcting, by the memory device, an error of the read data and the read system error correction code based on the read in-memory error correction code;

storing, by the memory device, the read address as an error correction address when the error is corrected in the correcting of the error;

transmitting, by the memory device, the error-corrected data and system error correction code to the memory controller;

correcting, by the memory controller, an error of the error-corrected data transmitted from the memory device, based on the error-corrected system error correction code transmitted from the memory device;

transferring, by the memory controller, a read retry command and a read retry address to the memory device when a failure occurs in the correcting of the error of the error-corrected data;

reading, by the memory device, the data, the system error correction code, and the in-memory error correction code which are stored in the memory device, based on the read retry address and the read retry command;

comparing the read retry address with the error correction address;

when the read retry address and the error correction address are the same in the comparing, transmitting, by the memory device, the data and the system error correction code that are read based on the read retry address and the read retry command to the memory controller without error correction; and correcting, by the memory controller, an error of the data transmitted from the memory device, based on the system error correction code transmitted from the memory device.

13. The method of claim 12, further comprising:

when the read retry address and the error correction address are different from each other, correcting, by the memory device, an error of the data and the system error correction code corresponding to the read retry address, based on the in-memory error correction code corresponding to the read retry address, and transmitting, by the memory device, the error-corrected data and the error-corrected system error correction code to the memory controller.

14. The method of claim 12, further comprising:

when the read retry address and the error correction address are different from each other, transmitting, by the memory device, data of a predetermined pattern to the memory controller.

15. The method of claim 12, wherein when the read retry address and the error correction address are different from each other, the memory device transmits no data corresponding to the read retry command to the memory controller.

16. The method of claim 12, further comprising:

generating, by the memory controller, the system error correction code based on a write data;

transferring, by the memory controller, a write command, a write address, the write data, and the system error correction code to the memory device;

generating, by the memory device, an in-memory error correction code based on the write data and the system error correction code; and storing, by the memory device, the write data, the system error correction code, and the in-memory error correction code corresponding to the write command and the write address in the memory device.

17. The method of claim 12, wherein the memory device has a lower error correction capability than the error correction capability of the memory controller.

18. A memory device, comprising:

an in-memory error correction code generating circuit suitable for generating, in a write operation, an in-memory error correction code based on data and a system error correction code provide by a memory controller;

a memory core suitable for storing the data, the system error correction code, and the in-memory error correction code; and an in-memory error correction circuit suitable for correcting, in a read operation, an error of the data and the system error correction code which are read from the memory core, based on the in-memory error correction code read from the memory core, wherein the error-corrected data and system error correction code are provided to a memory controller in the read operation, and when a read retry operation is performed on a same address as the error-corrected data, the data and the system error correction code bypassed by the in-memory error correction circuit or error correction bit information, are provided to the memory controller.

* * * * *